United States Patent [19]
Gutman et al.

[11] Patent Number: 5,221,838
[45] Date of Patent: Jun. 22, 1993

[54] ELECTRONIC WALLET

[75] Inventors: Jose Gutman, Boynton Beach; Jim Wright, Coral Springs, both of Fla.; Louis D. Finkelstein, Wheeling; Larry Puhl, Sleepy Hollow, both of Ill.

[73] Assignee: Motorola, Inc., Schaumburg, Ill.

[21] Appl. No.: 964,105

[22] Filed: Oct. 20, 1992

Related U.S. Application Data

[63] Continuation of Ser. No. 632,714, Dec. 24, 1990, abandoned.

[51] Int. Cl.$^5$ .............................................. G06F 15/30
[52] U.S. Cl. .................................. 235/379; 235/380; 235/472
[58] Field of Search ..................... 235/379, 380, 472; 364/704

[56] References Cited

U.S. PATENT DOCUMENTS

| | | | |
|---|---|---|---|
| 4,211,919 | 7/1980 | Ugon | 235/487 |
| 4,277,837 | 7/1981 | Stuckert | 235/380 |
| 4,724,527 | 2/1988 | Nishimura | 364/705 |
| 4,773,032 | 9/1988 | Uehara et al. | 235/472 X |
| 4,831,647 | 5/1989 | D'Avello et al. | 379/91 |
| 4,839,628 | 6/1989 | Davis et al. | 340/311.1 |
| 4,843,385 | 6/1989 | Borras | 340/825.32 |
| 4,884,212 | 11/1989 | Stutsman | 364/479 |
| 4,891,836 | 1/1990 | Takahashi | 379/100 |
| 4,910,510 | 3/1990 | Davis et al. | 340/825.44 |
| 4,910,696 | 3/1990 | Grossman et al. | 364/705.02 |
| 4,939,514 | 7/1990 | Miyazaki | 341/22 |
| 4,951,044 | 8/1990 | Nelson et al. | 340/825.44 |

FOREIGN PATENT DOCUMENTS 63-14563 1/1988 Japan.

OTHER PUBLICATIONS

Norand Data Systems, "80 Column Printer" copyright 1988.
Motorola, Inc., "KDT840 Portable Data Terminal User's Guide", ©1990.
The Sharper Image Catalog, "Sanyo Cordless Pulse Monitor", Dec. 1990.

Primary Examiner—Harold Pitts
Attorney, Agent, or Firm—Jose Gutman; William E. Koch; Thomas G. Berry

[57] ABSTRACT

An electronic wallet includes memory for storing at least a balance corresponding to an account in a financial institution, and a selective call receiver for receiving a wireless message transmitted from a remote transmitter, the wireless message including financial information relating to the balance for confirming a financial transaction with the financial institution. A controller, coupled to the memory and to the receiver, can update the balance in the memory in response to the wireless message.

communication system enters financial transactions into the communication system from one of a plurality of associated portable data devices, and updates the financial transactions from the communication system to the one and to at least a second of the plurality of associated portable data devices via wireless message communication from at least one remote transmitter.

38 Claims, 15 Drawing Sheets

ELECTRONIC WALLET

This is a continuation of application Ser. No. 632,714, filed Dec. 24, 1990 and now abandoned.

FIELD OF THE INVENTION

This invention relates generally to portable communication devices capable of communicating financial information, and including but not limited to those portable communication devices capable of selective call communication of messages that may include financial information, and further capable of storing and updating at least one of the financial information and a balance.

BACKGROUND OF THE INVENTION

In today's world of financing and personal money management, convenience and time are extremely valuable commodities. Contemporary financial comminication systems significantly improve accessibility to financial information and substantially facilitate financial transactions. However, a number of unfortunate limitations reduce the potential convenience and time efficiency for a user of these financial communication systems.

Conventional financial communication systems typically receive financial information (e.g., a request for a financial transaction) from an individual using a dedicated terminal device (e.g., an Automatic Teller Machine (ATM), a point of sale (POS) terminal, or a video display terminal (VDT) connected to a central financial computer). In the aforementioned devices, a user of the dedicated terminal communicates a request for a financial transaction via direct wireline and/or modem communication. Furthermore, the user is normally required to be physically present at the terminal device to initiate a financial transaction. Unfortunately, the terminal device is normally located at a fixed site, such as a banking facility. Also, the financial information is typically maintained electronically within the financial communication system, and usually only a paper receipt is provided to the user.

For example, an individual desiring to withdraw a sum of money from a bank account is usually required to physically commute to a banking facility or to an ATM to perform the financial transaction. Also, the individual is typically required to present a corresponding ATM financial card for identification. Consequently, a financial card for each financial institution must normally be carried on one's person at all times. Lastly, after the transaction is consummated, the information is typically maintained electronically at the banking facility and only a paper receipt is provided to the individual. Hence, at least one additional step is required for the individual to manually transfer the financial information (i.e., an update to a balance) to a financial log or diary (e.g., one normally included with a check book).

In a second example, to execute a purchase the individual normally surrenders some form of money (e.g., cash, check, or financial card) in exchange for goods or service. At the point of sale, the individual may present cash in exchange for a merchandise and receive a paper receipt for the transaction. In the case of a check transaction, an establishment may honor a check, usually after collecting the individual's personal information (e.g., a driver's license number, and a financial card number and expiration date), and complete the check purchase transaction as discussed earlier for the cash purchase transaction. Alternatively, by using a financial card (e.g., a credit card) a financial card transaction is substantially more complicated, as will be discussed below.

In the financial card transaction, the individual must usually select and present one of many financial cards that are necessarily carried on one's person. A point of sale (POS) terminal usually reads the financial card for financial information and additionally receives keyboard entry of a purchase price and associated information. The POS terminal then normally auto-dials a central financial computer to verify an identification code and an allowable credit limit. Upon approval, a balance at the central financial computer is updated accordingly, and the individual must normally confirm the transaction with a signature on a paper receipt, copies of which are divided among the individual, the establishment, and a central financial institution (e.g., MasterCard or Visa). A financial card transaction, therefore, allows the convenience of carrying minimal amounts of cash, however at the expense of a more complicated financial transaction and an additional processing fee for the financial service provided.

In the cash transaction, the individual normally receives a paper receipt and must perform additional steps to collect and record the financial information associated with the transaction. Usually, the individual manually transfers the financial information from the paper receipt to a financial log or diary.

Unfortunately, the check transaction additionally requires maintaining a paper trail for an extended time period. Typically, the check is honored by the establishment with little or no verification of the funds actually being available at a financial institution (e.g., a bank). Consequently, a paper trail must be maintained both by the individual and the establishment for at least until the financial institution honors the check (i.e., a check float period). This float period tends to be confusing, and with multiple checks written increases the probability of an error by the individual (i.e., typically in not maintaining proper account of a checkbook balance) leading to a check not honored by the financial institution (i.e., a check written on an overdrawn bank account). In such a case, the establishment must find the individual and retrieve the cash due (i.e., usually including a penalty fee).

In the case of the financial card transaction, the consummation of the financial transaction is normally more complicated and requires additional parties (e.g., the central financial institution) immediately in the transaction. The communication of financial information between the establishment, the individual, and the financial institution typically requires a number of steps to close the financial card transaction.

Additionally, the financial information is only maintained electronically at the financial institution. Hence, a redundant paper trail is required to record and maintain the financial information with all parties to the financial card transaction.

Lastly, the individual making the purchase must manually transfer the financial information to a financial log or diary, thereby maintaining a personal account (i.e., a balance) of all transpired financial card transactions. Similar to the check transaction, previously discussed, an error by the individual while manually maintaining a balance in a financial log or diary for each financial card may result in exceeding a credit limit for a financial card, thereby including all associated consequences.

Moreover, this situation is particularly problematic when multiple financial cards or multiple checkbooks (i.e., with the same account identification information) are distributed between two or more individuals (e.g., between husband and wife, or between partners in a business). The concurrent use of the same financial card or checkbook account by many individuals may typically result in lost or untimely financial information maintained by at least one of the individuals, and consequently result in an exceeded financial card credit limit or a bounced check.

In a third example, an individual purchasing groceries at a supermarket is currently required to push a cart through many aisles stocked with grocery items. Selection of items and comparison of alternatives is performed manually, and usually while standing at a shelf in the supermarket. If a product is not present at the shelf, possibly due to stocking space limitations, the product is not considered. Additionally, the comparison of product attributes in executing a selection to initiate a purchase transaction (e.g., prices, nutritional content, etc. . . . ) must normally be performed manually by reading the product labels, the supermarket labels, and mentally calculating the differences between alternative products. Very little assistance is provided the individual in performing the purchase transaction, other than stocking the items on the supermarket shelves. Lastly, the loaded shopping cart must usually be pushed around the entire supermarket and subsequently stand in line waiting for a cashier to tally up the total bill. After the cashier provides a total due, the individual consummates the purchase transaction by providing the proper monetary exchange for the groceries (e.g., cash, check, or financial card). The individual then faces all the similar limitations and hindrances presented in the second example above.

Therefore, it is unfortunate that no contemporary device is capable of effectively dealing with the aforementioned encumbrances to financial communication systems.

SUMMARY OF THE INVENTION

In carrying out one form of this invention, there is provided an electronic wallet, comprising storing means for storing at least a balance corresponding to an account in a financial institution, selective call receiving means for receiving a wireless message transmitted from a remote transmitter, the wireless message including financial information relating to the balance for confirming a financial transaction with the financial institution, and updating means, coupled to the storing means and to the receiving means, for updating the balance in the storing means in response to the wireless message.

In another aspect of the present invention, a communication system comprises means for entering a financial transaction into the communication system from one of a plurality of associated portable data devices, and means for updating the financial transaction from the communication system to the one of the plurality of associated portable data devices and to at least a second portable data device of the plurality of associated portable data devices via wireless message communication from at least one remote transmitter.

DESCRIPTION OF A PREFERRED EMBODIMENT

Satisfying consumer demand for convenience and timeliness in dealing with financial transactions may be accomplished with an electronic wallet. A user of such an electronic wallet, in its embodiments, may be capable of successfully initiating and confirming a financial transaction in a timely fashion. Further, by maintaining personal financial information readily accessible to the user, the electronic wallet enhances the user's convenience while performing the financial transaction, as will be more fully discussed below.

Figure 1:
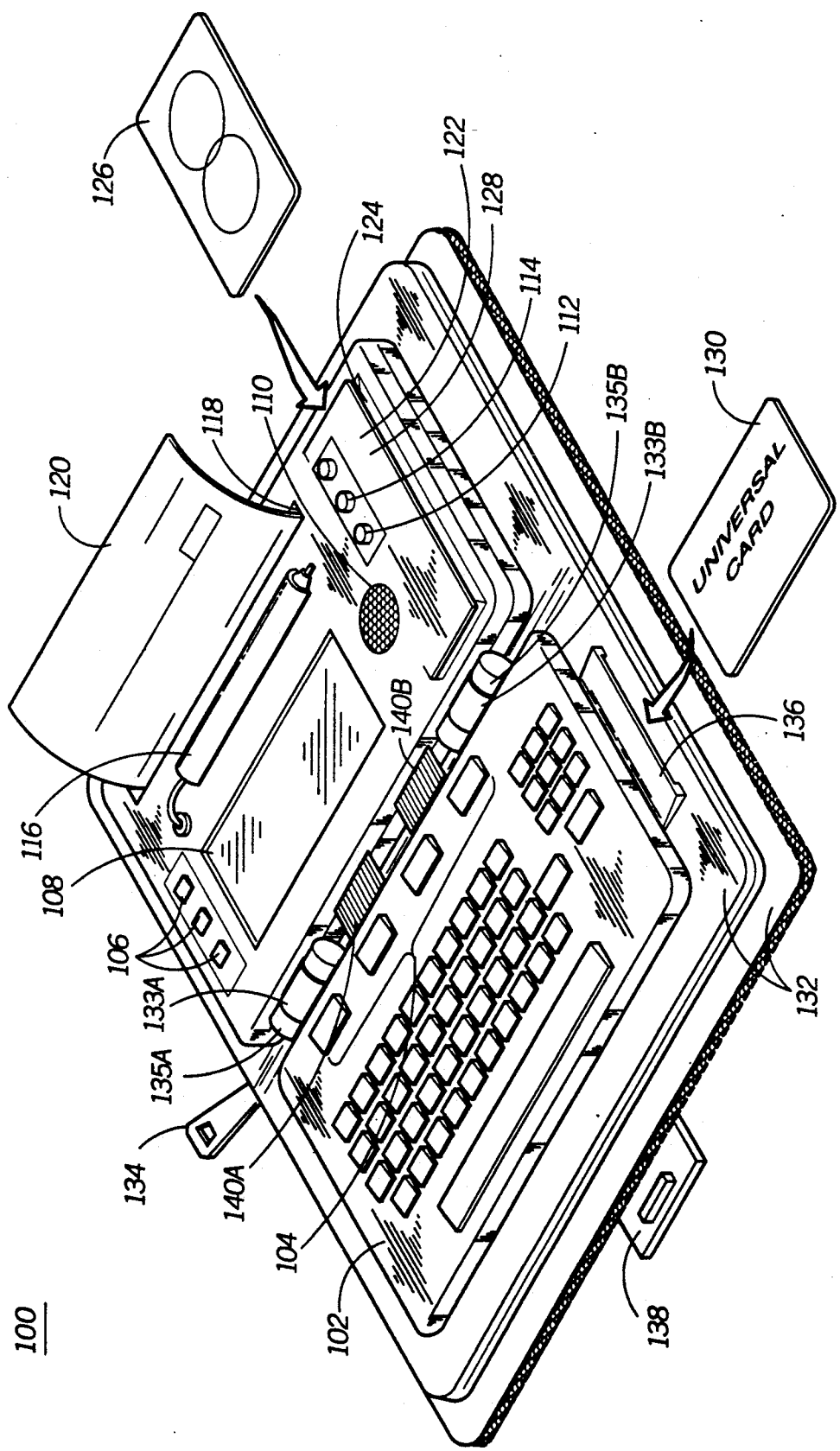
FIG. 1 is a perspective view of an electronic wallet in accordance with an embodiment of the present invention.

Referring to FIG. 1, a perspective view of a communication device (e.g., an electronic wallet) 100 is shown, in accordance with an embodiment of the present invention. Such an electronic wallet 100 preferably comprises a selective call receiver (not shown) capable of receiving a wireless message for communicating financial information with a central financial computer (not shown), as will be subsequently more fully discussed.

Such a wireless message may be communicated via a communication system (not shown) comprising wireless communication means (i.e., other than an electronic signal through wire or other physical coupling means). The wireless communication means may comprise radio frequency (RF) communication, microwave communication (e.g., satellite communication), optical communication (e.g., infrared (IR) communication), and ultrasound communication. Therefore, a message communicated via the wireless communication means may be considered a wireless message.

In one embodiment of the present invention, the electronic wallet 100 further comprises user input controls (e.g., a keyboard 102, function keys 104, and buttons 106) for receiving user input data and commands, and a display (e.g., a liquid crystal display) 108 for displaying information to a user of the electronic wallet 100. Also, three means for indicating to the user of the device are provided: an audible alert indicator (e.g., a speaker or a transducer) 110, a visual alert indicator (e.g., a lamp 112, a light emitting diode 114, or an icon representation on the display 108), and a tactile alert indicator such as a vibrator (not shown). The tactile alert indicator is capable of silently alerting a user of the electronic wallet 100.

Further, this embodiment of the present invention comprises a bar code reading device (e.g., an optical wand 116 coupled to the electronic wallet 100 for reading bar code information in a known way) to conveniently capture bar code information into the electronic wallet 100. The electronic wallet 100 may indicate to the user the status of reading a bar code symbol by using one or more of the aforementioned means for indicating. A bar code is a self-contained message with information encoded in the widths of bars and spaces in a printed pattern. The bar code information is normally read by sweeping a small spot of light across the printed bar code symbol. The most widely used bar code format is the Universal Product Code (UPC), which is a subset of the European Article Numbering (EAN) or World Product Code (WPC). This bar code format is used internationally to identify retail food products and general merchandise. Particularly in contemporary supermarkets, reading the UPC from products as part of initiating a purchase transaction is a standard business practice. However, a number of bar coding standards may be supported by the electronic wallet 100 (e.g., Code 39, UPC/EAN, Standard 2 of 5, Interleaved 2 of 5, and Codabar).

Additionally, a printer (e.g., a conventional thermal printer, or an impact printer) 118 is included in this embodiment of the electronic wallet 100 for printing checks 120 and other printed hardcopy. Although the absolute elimination of paper in financial transactions may appear very attractive, it is expected that some financial transactions may nonetheless require a paper check or voucher 120 (i.e., a paper trail). By printing a check 120 directly from the electronic wallet 100, a user of the device may be capable of reducing the amount of manual entry and tabulation normally required with conventional checkbooks. Consequently, the possibility for entry errors are substantially reduced. Lastly, by linking the transaction information printed on the check 120 with the information stored in the electronic wallet 100, a check transaction may be automatically monitored, verified, and confirmed by the electronic wallet 100 with minimal effort by the user, as will be more fully discussed below.

Furthermore, a financial card reader 122, such as a magnetic card reader having a slot 124 capable of receiving a financial card (e.g., a MasterCard or Visa card) 126, for reading a representation of a financial information from the financial card 126 is included. Such a financial card reader 122 may serve to read financial information from most or all of one's personal financial cards using known standards (e.g., ANSI X4.16-1983 "American National Standard for Financial Services—Financial Transaction Cards—Magnetic Stripe Encoding") and known techniques. The electronic wallet 100 may indicate to the user the status of reading a financial card by using one or more of the aforementioned means for indicating. The financial information may subsequently be stored into the electronic wallet 100. An exemplary communication system incorporating a financial card reader at a mobile radiotelephone unit is discussed in U.S. Pat. No. 4,831,647, issued May 16, 1989, to D'Avello et al. and entitled "Radiotelephone Credit Card Data Communications", which is assigned to the assignee of the present invention and which is incorporated by reference herein.

In similar fashion, a financial card writer 128, such as a magnetic card writer that may be collocated with the magnetic card reader and slot 124, is capable of writing a representation of a financial information from the electronic wallet 100 to a financial card (e.g., a universal financial card 130) using known standards (e.g., ANSI X4.16-1983 "American National Standard for Financial Services—Financial Transaction Cards—Magnetic Stripe Encoding") and known techniques. Similarly, the electronic wallet 100 may indicate to the user the status of writing a financial card by using one or more of the aforementioned means for indicating.

Consequently, by reading all of one's personal financial cards 126 into the electronic wallet and selectively writing financial information to the universal financial card 130, efficient use of space in the wallet 100 may result (i.e., since only one universal financial card 130 may be carried with the electronic wallet 100 to effect financial transactions). Additionally, the financial information from multiple financial cards may be better organized and secured in one place (i.e., within the electronic wallet 100). These and other advantages will be subsequently more fully discussed.

Lastly, the electronic wallet 100 may be secured within a corresponding pocketbook or pouch (e.g., a leather wallet) 132 by securing straps (133A and 133B). Additionally, the universal financial card 130 may be secured within a pocket 136 in the pocketbook 132. Hence, the pocketbook 132 may be zippered (134) closed (i.e., by folding the two halves of the electronic wallet 100, coupled together at hinges 135A and 135B and at flex circuits 140A and 140B), thereby providing added security for all components during transport. Preferably, a physical locking mechanism (e.g., a locking latch and key) 138 may be included with the pocketbook 132 to physically secure access to the electronic wallet 100 and to the universal financial card 130. In this way, only an authorized physical access to the financial information and the electronic wallet 100 may be allowed. However, other security measures may further secure access to the financial information and to functions of the electronic wallet 100, as will be more fully discussed below.

Figure 2A:
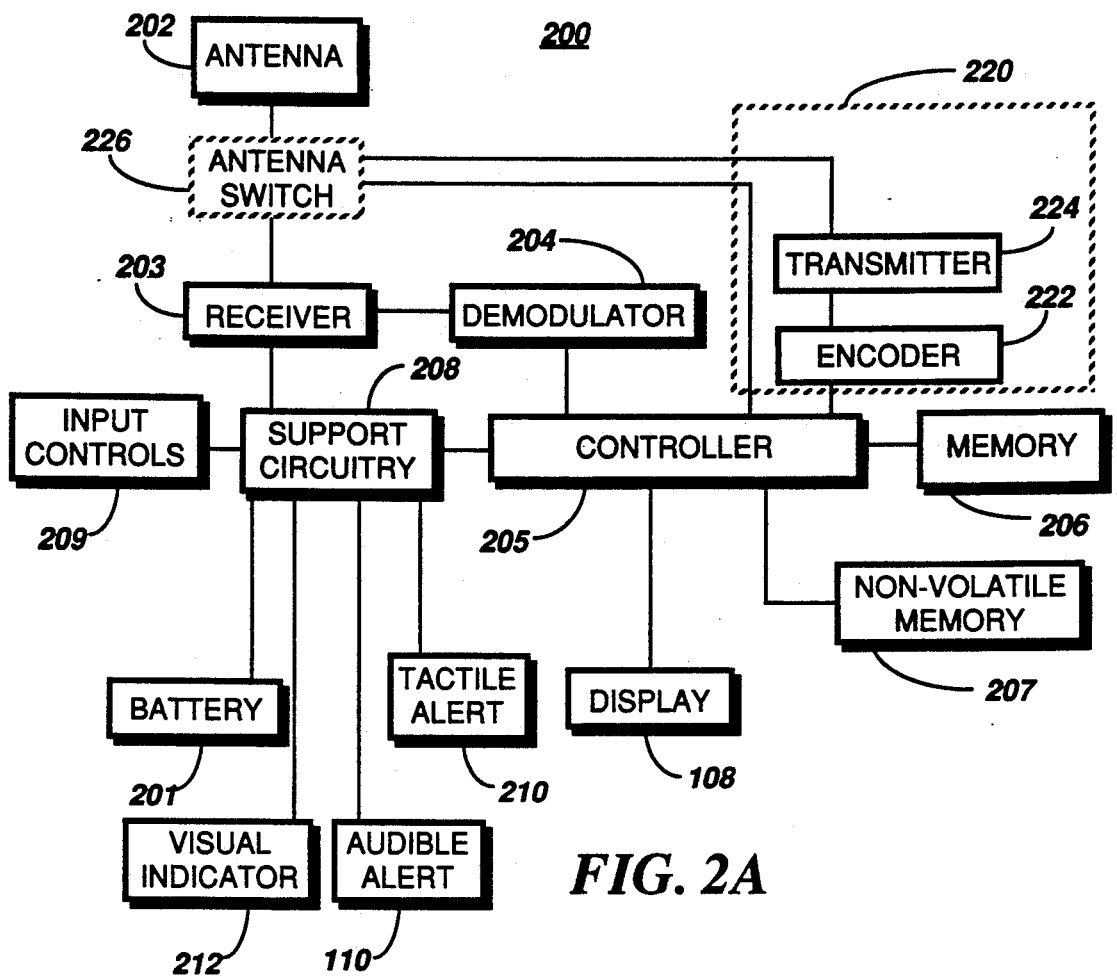
FIGS. 2A and 2B comprise a block diagram of the electronic wallet of FIG. 1.
Figure 2B:
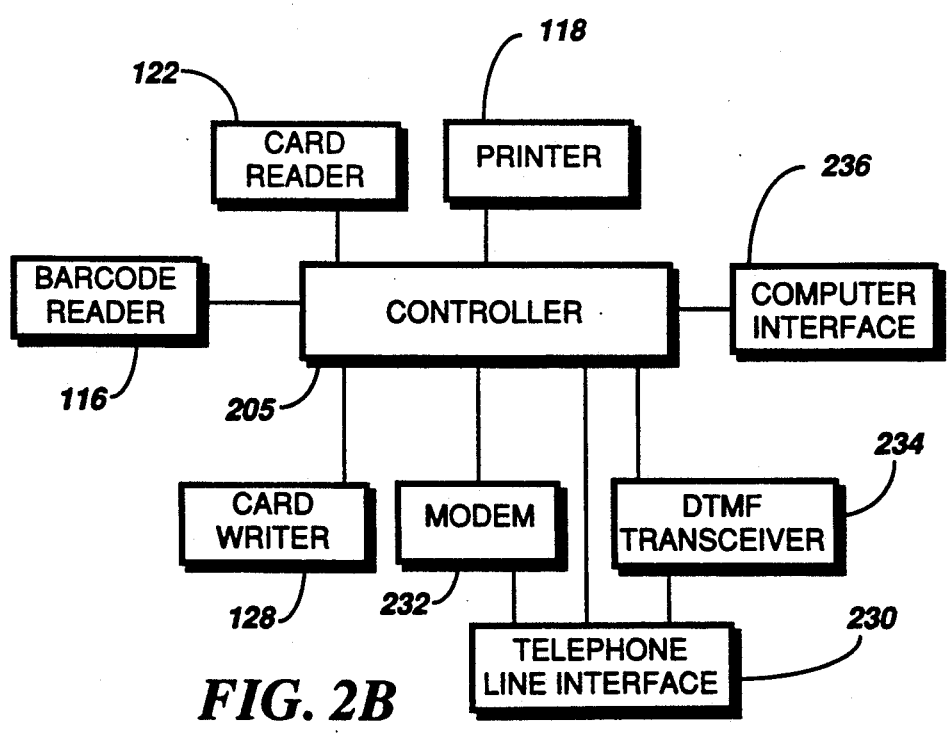

Referring to FIGS. 2A and 2B, a block diagram of the electronic wallet 100 of FIG. 1 is shown, according to the present invention. The electronic wallet 100 is battery 201 powered and comprises a selective call receiver 200 (see FIG. 2A) that operates to receive a signal via an antenna 202. A receiver 203 couples the received signal to a demodulator 204, which recovers any information signal present using conventional techniques. The recovered information signal is coupled to a controller 205 that interprets and decodes the recovered information. In the preferred embodiment, the controller 205 may comprise a microprocessor having a signal processor (decoder) implemented in both hardware and software.

The recovered information signal is checked by the decoder, which implements the signal processor that correlates a recovered address (i.e., a recovered information signal comprising address information) with a predetermined address stored in the selective call receiver's non-volatile memory 207. The non-volatile memory 207 typically includes a plurality of registers for storing a plurality of configuration words that characterize the operation of the selective call receiver 200 and the electronic wallet 100. In determining the selection of the selective call receiver 200, a correlation is performed between a predetermined address associated with the selective call receiver 200 and a received and recovered address, preferably following a conventional signalling protocol such as Post Office Code Standardisation Advisory Group (POCSAG) or Golay Sequential Coding (GSC). When the addresses correlate, the controller 205 may store a received and recovered message (i.e., a wireless message that is coupled to the correlated address information) to a memory 206. Additionally in the preferred embodiment, the controller 205 may comprise a timer module capable of maintaining time information. Consequently, the controller 205 may store time information in memory 206. Accordingly, a time stamp may be stored into memory 206 along with the received and recovered message information.

Optionally, at least a portion of the message information format may be encrypted (i.e., enciphered) for security during communication of sensitive information (e.g., financial information used in a financial transaction). Consequently, the encrypted message information format may be decrypted (i.e., deciphered) using known standards (e.g., "Data Encryption Standard" (DES), FIPS PUB 46, Jan. 15, 1977, which is available from the U.S. Department of Commerce, or a next generation encryption standard available). The DES standard allows binary coded data to be cryptographically protected using the DES algorithm in conjunction with a 56 bit key. An authorized user of the encrypted message information must have the key that was used to encipher the data in order to use it. Hence, the encrypted message information is in an unintelligible form (i.e., called cipher), and can be recovered from cipher only by using exactly the same key used to encipher it. By having a unique key assigned to the electronic wallet 100 within a financial communication system, the electronic wallet 100 is capable of securely receiving and decrypting sensitive messages. The controller 205 may decrypt a received and recovered message (i.e., or at least a portion of the message) before storing information and/or updating a balance to memory 206. Alternatively, information may be stored and/or a balance may be updated to memory 206 in the encrypted form for added security, only being decrypted as needed.

In accordance with the recovered information included with the message, and settings associated with the user input controls 209 (e.g., a keyboard 102, function keys 104, and buttons 106) (see FIG. 1), the controller 205 may update financial information and/or update a balance in memory 206. Hence, the balance may be updated in response to the wireless message. Such a balance in memory 206 may partially or totally represent a summary of transaction activity for an account at a financial institution. Therefore, the electronic wallet 100 is capable of maintaining financial information that may include a balance summary of transaction activity for an account at a financial institution (e.g., a bank).

Moreover, at least a portion of the stored information (e.g., the financial information and the balance) may preferably be in an encrypted form in memory 206, only being decrypted as needed. This enhances the security of the information stored in the electronic wallet 100. The unique key may be stored in non-volatile memory 207. Only by applying the key with the decrypting algorithm may the encrypted information be available in a usable form. Hence, access to the stored information in the electronic wallet 100 may be controlled in a number of ways. First, a physical locking mechanism may be provided to limit physical access, as discussed earlier. Second, access to the electronic wallet 100 may be secured by requiring a password to be entered by a user before proceeding with functions of the device. This password may be entered by a user via the user input controls 209 (e.g., the keyboard 102). Third, in the event of losing the electronic wallet 100, a user may arrange with an operator of the communication system to send an access control message to the electronic wallet 100. Once the electronic wallet 100 receives and decodes the access control message, an internal flag in non-volatile memory 207 may be set to completely lockout user access to functions of the electronic wallet 100. Also, the unique key required for decryption may be erased in non-volatile memory 207. Therefore, at least a portion of the information stored in memory 206 in encrypted form may remain secure. Upon recovering the lost electronic wallet 100, in the latter case, a user may return the device to the communication system operator to restore user access to functions of the electronic wallet 100, and to restore the unique key to non-volatile memory 207.

Further, the electronic wallet 100 typically may present at least a portion of the financial information and the balance, such as by a display 108, and usually may signal the user via any combination of an audible alert indicator 110, a tactile alert indicator 210, and a visual alert indicator 212 (e.g., a lamp 112, a light emitting diode 114, or an icon representation on the display 108) (see FIG. 1) that a message has been received. The user may view at least a portion of the financial information and the balance presented on the display 108 by activating the appropriate input controls 209. Alternatively, the presentation of at least a portion of the financial information and the balance may be printed hardcopy using the printer 118, similarly activated with the appropriate input controls 209.

A support circuit 208 preferably comprises a conventional signal multiplexing integrated circuit, a voltage regulator and control mechanism, a current regulator and control mechanism, environmental sensing circuitry such as for light or temperature conditions, audio power amplifier circuitry, control interface circuitry, and display illumination circuitry. These elements are arranged to provide support for the functions of the electronic wallet 100 as may be requested by a user.

Optionally, the electronic wallet 100 may be capable of transmitting a message including information relating to the balance using conventional techniques (e.g., RF communication, IR communication, and microwave communication). At least a portion of the message may preferably be encrypted before transmission using the aforementioned DES encryption standard or next generation encryption standard available. A transmitter module 220 may comprise an encoder 222, a transmitter circuitry 224, and an antenna switch 226. The encoder 222 encodes the message using conventional techniques, preferably according to a standard protocol (e.g., a cellular modem protocol). The encoding may accordingly result in an analog or a digital signal for subsequent transmission. An address information that is normally coupled with the message may select a receiver (not shown) for destination corresponding to a central financial institution (e.g., a bank) computer. Further, upon the controller 205 activating the antenna switch 226, the transmitter circuitry 224 may transmit a transmit signal via the antenna 202, the transmit signal comprising the encoded message and address information. An exemplary communication system incorporating selective call receivers (e.g., paging receivers) that are capable of transmitting a message to a receiving paging terminal is discussed in U.S. Pat. No. 4,951,044, issued Aug. 21, 1990, to Nelson et al. and entitled "Paging Terminal Apparatus with User Selectable Page Forwarding Capability and Methodology Therefor", which is assigned to the assignee of the present invention and which is incorporated by reference herein. Some advantages of transmitting from the electronic wallet 100 a message that may include information relating to the balance will be subsequently more fully discussed.

Additionally, the electronic wallet 100 may preferably include telephone interface circuitry 230, a modem 232, and a Dual Tone Multi-Frequency (DTMF) transceiver 234 that are coupled to the controller 205. Hence, communication of financial information may also be accomplished using modem communication and/or DTMF tone communication via a telephone line, using known techniques. For example, DTMF (or tone) communication may serve to dial a telephone number for a central financial computer system. Subsequently, DTMF and/or modem communication may be used to communicate the financial information (e.g., initiate financial transactions by sending messages). Therefore, a dial-up telephone line that is part of the public switched telephone network (PSTN) may couple messages between the electronic wallet 100 and a central financial computer system (not shown).

Moreover, an optional computer interface 236 coupled to the controller 205 (e.g., following RS-232 or RS-422 serial computer interface standards) may interface the electronic wallet 100 directly with communication system terminal equipment (not shown). Consequently, a user may communicate with a central financial computer system via a dedicated interface for the communication system. Therefore, an electronic wallet 100 may communicate messages and perform financial transactions via the computer interface 236, as will be more fully discussed below. Additionally, the electronic wallet 100 may communicate information with a personal computer (PC) or other personal organizer device via the computer interface 236. Consequently, a user may conveniently maintain current personal information, financial information, and a balance summary of account transactions in a PC or other organizer device, updated from the electronic wallet 100 as necessary.

Figure 3:
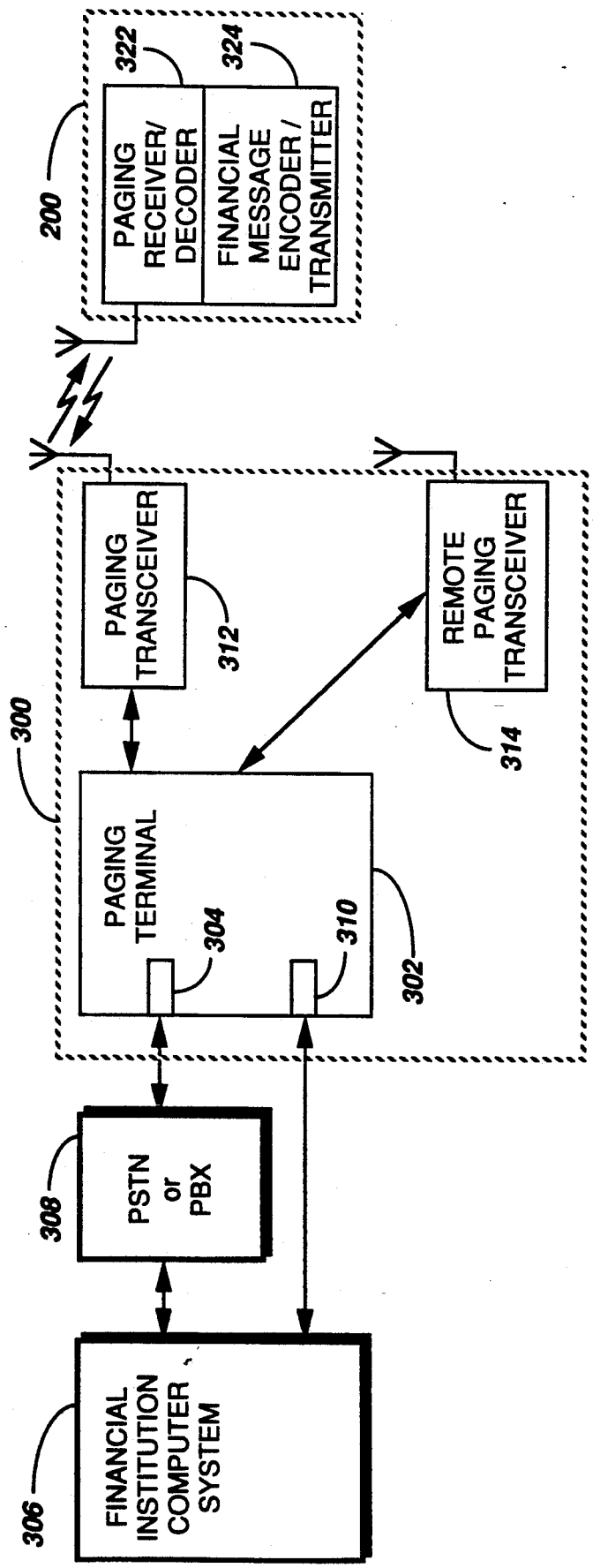
FIG. 3 is a block diagram of a communication system in accordance with an embodiment of the present invention.

Referring to FIG. 3, a block diagram of a communication system (e.g., a paging system 300) is shown, in accordance with an embodiment of the present invention. The paging system 300 may interface with a financial institution computer system 306 via telephone company equipment (e.g., the public switched telephone network (PSTN), or a private branch exchange (PBX)) 308. Typically, these types of telephone lines are dial-up lines (i.e., where an originating party dials a telephone number to connect to an answering party). On either side of the telephone company equipment 308 may incorporate automatic telephone interfacing equipment 304. Such automatic interfacing equipment 304 may allow automatic dial-in/dial-out communication, as will be subsequently more fully discussed. However, a dedicated computer interface 310 between the financial institution computer system 306 and the paging terminal 302 may provide a higher level of security and reliability. Such an interface may comprise dedicated lines and interfacing circuitry 310 following a serial RS-232 or RS-422 standard, or another conventional computer interfacing protocol.

The paging terminal 302 may receive a message from the financial institution computer system 306 via one of the aforementioned interfaces (304 or 310), in a known way. Preferably, at least a portion of the message is in encrypted form for secure communication. Normally, the message is coupled to address information to identify the destination for the message. The message may subsequently be routed via either a local paging transceiver 312 or a remote paging transceiver 314, and received and decoded (322) by at least one selective call receiver 200 of an electronic wallet 100, using known techniques. Additionally in some applications, communication of the wireless message via the remote paging transceiver 314 may comprise microwave communication (e.g., satellite communication), using known techniques.

To select a plurality of selective call receivers for destination, the paging terminal 302 may internally map the address information from the financial institution computer system 306 to a group of addresses, each address selecting a selective call receiver 200. Consequently, the paging system 300 may repeatedly transmit the message coupled to each and every address in the group. Alternatively, each and every selective call receiver 200 that is in a group may be responsive to the same "group" addresss. Hence, all selective call receivers in a group may receive the one message coupled to the transmitted "group" address. The latter case may be more efficient in system throughput, since only one address/message pair is normally transmitted. However, the previous case provides considerable flexibility in configuring members into or out of a group, since the paging terminal 302 may be more accessible and easier to configure than the plurality of electronic wallets (100) that may be already distributed to users. Therefore, a financial institution may communicate a message (e.g., a message having information related to a financial transaction) and update each of a plurality of selective call receivers with the message.

Alternatively, the selective call receiver 200 may encode and transmit (324) a message to the paging terminal 302 via one of the paging transceivers (312 or 314). Preferably, at least a portion of the message may be encrypted for security. An address included with the transmitted message may select the paging terminal 302 as a destination, which decodes and stores the message at the paging terminal 302. Subsequently, the paging terminal 302 may couple the message to the financial institution computer system 306 via the telephone company equipment 308 or via the dedicated computer interface 310. Optionally, a second address may be included with the message transmitted from the selective call receiver 200. This second address may select a financial institution computer system 306 for destination of the message. Consequently, the paging terminal 302 may verify the optional second address, identify a corresponding telephone number, and forward the message to the selected financial institution computer system 306 (i.e., by dialing-out through the PSTN 308). Therefore, a communication system (e.g., a paging system 300) may be capable of servicing a plurality of financial institutions. And, each financial institution computer system 306 may be capable of communicating messages with at least one electronic wallet 100, as will be more fully discussed below.

Figure 4:
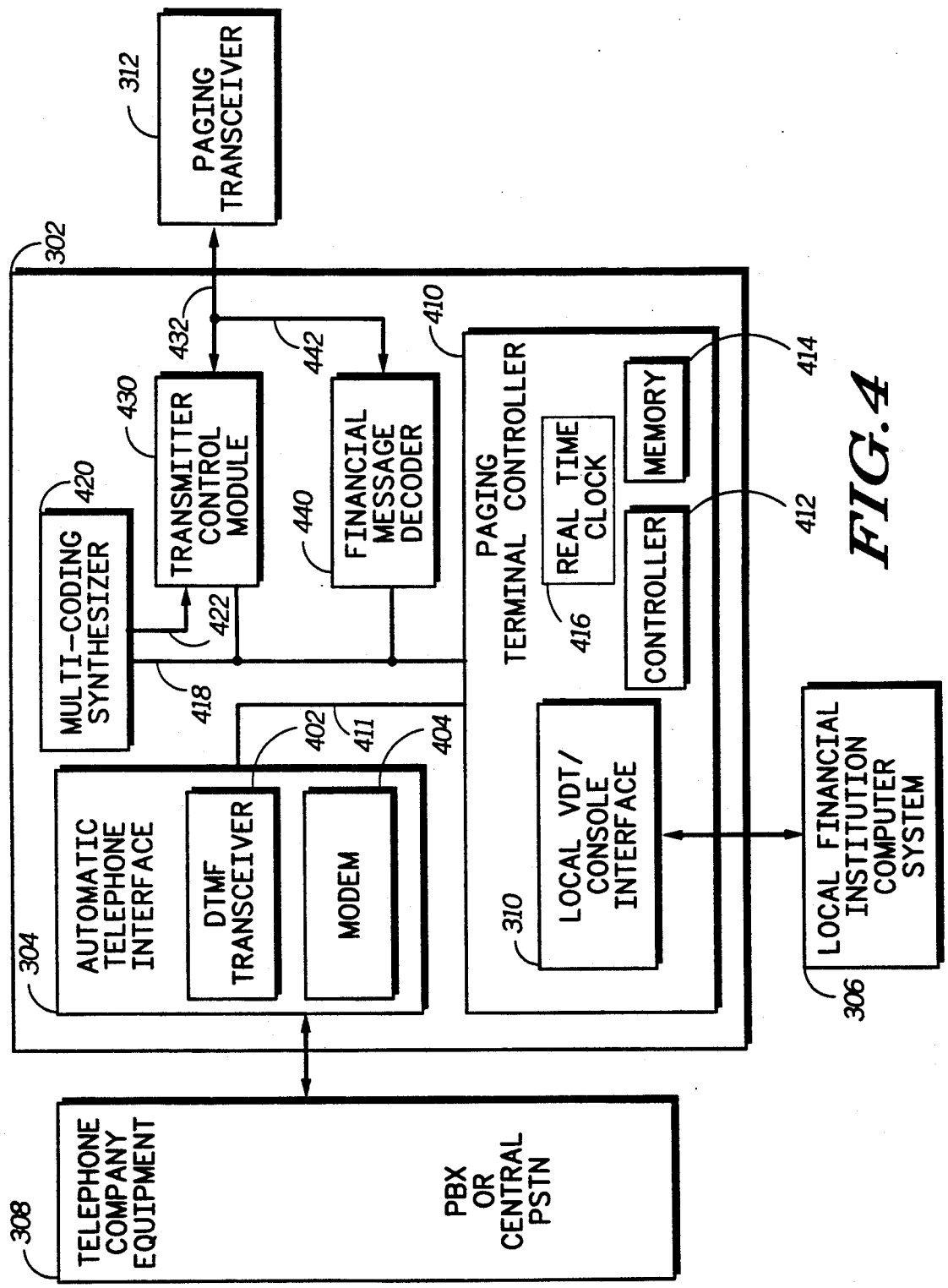
FIG. 4 is a more detailed block diagram of the paging terminal of FIG. 3.

Referring to FIG. 4, a more detailed block diagram of the paging terminal 302 of FIG. 3 is shown, according to the present invention. The automatic telephone interface 304 is capable of automatically receiving messages (i.e., page requests) from a financial institution computer system via telephone company equipment 308 (e.g., a private branch exchange (PBX), or a public switched telephone network (PSTN)). Alternatively, a local financial institution computer system 306 may interface with the paging terminal 302 via the local video display terminal (VDT) or console interface (i.e., the dedicated computer interface) 310, following conventional RS-232 or RS-422 in a known way.

The automatic telephone interface 304 normally answers an incoming call and prompts a caller (e.g., a calling financial institution computer system) through a preliminary identification and security procedure (e.g., entering a caller identification and an optional password). Subsequently, the paging terminal 302 may prompt the caller for a page request. Typically, the prompting and the handshaking between the caller and the paging terminal 302 is handled with a tone protocol (e.g., DTMF) (402) and/or a modem protocol 404, in a known way. When the page request is received from the caller, a controller 412, such as a microprocessor, verifies the requested pager address to a local database of valid pager addresses and message formats in an area of memory 414, and the paging terminal controller 410 instructs the automatic telephone interface 304 for subsequent prompting to the caller. Additionally, an accepted page request may be transferred from the automatic telephone interface 304 to the paging terminal controller 410 via the input control bus 411, and stored into an area of memory 414. Preferably, a representation of the current time (i.e., a time stamp) may be stored into memory 414 along with the accepted page request by the real time clock 416. Hence, time information may be included with the message that is transmitted to the selective call receiver 200. Once the page request is accepted, the automatic telephone interface 304 may terminate the call with the caller, thereby maintaining an overall communication system throughput by allowing other callers to access the communication system. However, in an alternate system embodiment, the caller may remain on the line to confirm that the electronic wallet 100 received and acknowledged the message. In this case, the selective call receiver 200 of the electronic wallet 100 may acknowledge back to the paging system 300, and consequently to the financial institution computer system 306, that the message was received and acknowledged by the electronic wallet 100, as similarly discussed in U.S. Pat. No. 4,951,044, issued Aug. 21, 1990, to Nelson et al. and entitled "Paging Terminal Apparatus with User Selectable Page Forwarding Capability and Methodology Therefor".

The page request information that is stored into an area of memory 414 typically comprises a pager address and a message formatted to the requirement of the particular page request, using known coding schemes (e.g., POCSAG and GSC). Once the page is ready to be sent to the selective call receiver 200, a multi-coding synthesizer module 420 receives the pager address information and the formatted message from the memory module 414 (i.e., via an output control bus 418). The pager address information instructs the multi-coding synthesizer module 420 as to what pager address and type of page encoding is needed to effectively transmit the page to the selective call receiver 200.

The paging terminal controller 410 finally instructs the transmitter control module 430 to turn "on" the paging transceiver (e.g., paging transmitter basestation) 312 and begin transmitting over the paging system channel. The multi-coding synthesizer module 420 is typically responsible for sending the encoded page information to the paging transceiver 312 (i.e., via a synthesizer output bus 422 and the transmitter control module 430), which routes the page over the paging system channel. Therefore, a page request may be received and accepted by the paging terminal 302, stored into a designated area of memory 414, and subsequently transmitted to a selective call receiver 200 subject to the availability of the paging system channel.

Moreover, the selective call receiver 200 of the electronic wallet 100 may transmit a message to the financial institution computer system 306, via the paging system 300. The transmitted message may be received and routed to the paging terminal 302 by the paging transceiver 312, using conventional techniques. Once the address information is determined to select the paging terminal 302, the message may be decoded by a financial message decoder 440 and subsequently coupled to a designated area of memory 414. Optionally, a time stamp (416) may also be stored in memory 414. According to the communication system configuration and the optional second address information that may be included with the message, as discussed earlier, the paging terminal controller 410 may instruct the automatic telephone interface 304 to dial-out to a corresponding financial institution computer system 306. Lastly, the message may be coupled to the financial institution computer system 306. Therefore, the electronic wallet 100 may initiate a transaction (e.g., a financial transaction) by transmitting a message to the financial institution computer system 306 via the paging system 300.

Referring to FIGS. 5A thru 5E, a number of exemplary transactions for the communication system 300 of the present invention are shown. These transactions represent a number of possible scenarios, including cash transactions, purchase transactions, and multiple electronic wallet transactions, as will be subsequently more fully discussed.

Figure 5A:
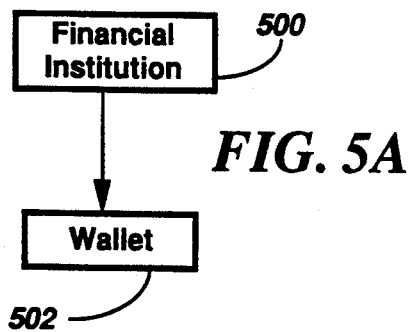
FIGS. 5A thru 5E are a number of block diagrams depicting exemplary transactions for the communication system of the present invention.

In FIG. 5A, a financial institution 500 sends a message to an electronic wallet 502 to perform a transaction. Some examples of such a transaction may include periodic credits to an account (e.g., such as a payroll direct deposit of one's salary to a bank account) or periodic debits to an account (e.g., automatic payment of expenses such as mortgage payments and car loan payments out of a bank account). In these examples, the financial institution 500 normally updates an account balance at the financial institution computer system 306 (see FIG. 3). However, a message may also be periodically transmitted from the communication system 300 to the electronic wallet 502 to update a corresponding balance in the memory 206 (see FIG. 2A) of the electronic wallet 502. In this way, the electronic wallet 502 may maintain current financial information that may include a balance summary of financial transactions for an account at a financial institution 500. Another exemplary transaction for FIG. 5A may be initiated by an operator of the communication system to control user access to a lost electronic wallet 502. It is not normally initiated by the electronic wallet 502, and therefore it is represented as a one way communication from the financial institution 500 to the electronic wallet 502.

Figure 5B:
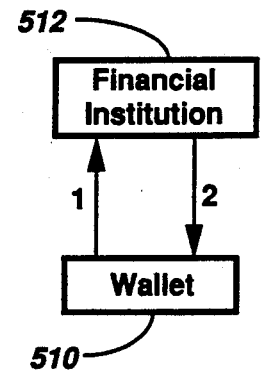

In FIG. 5B, an electronic wallet 510 initiates a transaction with a financial institution 512 by sending a message to the financial institution 512. This message may be entered into the financial institution computer system 306 (see FIG. 3) in a number of ways, as will be discussed below. Subsequently, the financial institution 512 sends a message to the electronic wallet 510 via the communication system 300. In this way, a transaction may be initiated from the electronic wallet 510 and verified and recorded at the financial institution 512. Further, the electronic wallet 510 may receive a confirmation message from the financial institution 512 to verify at the electronic wallet 510 the transaction with the message, and to update a balance in memory 206 (see FIG. 2A) in response to the message. An example of such a transaction may include a cash transaction (i.e., where the electronic wallet 510 communicates with the financial institution 512 to modify an amount in an account balance, such as by transferring cash from one account balance to another account balance). Additionally, the electronic wallet 510 may initiate a transaction to transfer cash from a borrowing account balance to a cash account balance. Hence, the user of the electronic wallet 510 may borrow cash from a credit account on demand (e.g., an unsecured emergency borrowing fund account having a prearranged credit limit, or a floating home equity loan account with a similar prearranged borrowing limit).

A number of ways may be available for initiating the transaction from the electronic wallet 510. First, the electronic wallet 510 may print (118) a check or voucher 120 that is presented to the financial institution 512 to initiate the transaction. Second, an information may be displayed (108) to a representative of the financial institution 512, thereby presenting transaction information via the display 108 to initiate the transaction. Consequently, in these cases, the financial institution 512 receives the information for the transaction with some manual intervention, since a user may enter transaction details into the electronic wallet 510 via user input controls 209. However, it requires minimal labor by the user of the electronic wallet 510. And, it significantly enhances the organization and maintenance of information in the electronic wallet 510 as part of making transactions. A third way for initiating the transaction comprises presenting the universal financial card 130 (see FIG. 1) as representation for a pre-approved financial card 126. The universal financial card 130 may be written with a representation of at least one of financial information that is stored in the electronic wallet 510 and the balance corresponding to a financial institution account. In this way, a user may initiate a transaction by presenting a financial card 130. Additionally, a user may enter transaction details into the electronic wallet 510 via user input controls 209 as necessary. A fourth, way for initiating the transaction comprises transmitting from the electronic wallet 510 a message including information relating to the balance. Typically, a communication system terminal equipment (e.g., a paging transceiver 312 (see FIG. 3)) may receive the message and route it to the financial institution computer system 306, as discussed earlier. A significant advantage is that the electronic wallet 510 may be carried on one's person to perform transactions without requiring a physical connection to the communication system terminal equipment. A fifth way for initiating the transaction, comprises coupling the electronic wallet 510 to the communication system terminal equipment via the computer interface 236 (see FIG. 2B), as discussed earlier. Although this coupling may require the user to be present at a designated location for the communication system terminal equipment, the message may be communicated to the financial institution computer system 306 using a more secure and reliable communication medium (e.g., dedicated lines). In a sixth way for initiating the transaction, the electronic wallet 510 may couple the message to the communication system via telephone lines. This method may use tone and/or modem communication to initiate the transaction. A major advantage of this approach for initiating transactions is the common availability of telephone lines. The transaction may be performed and confirmed totally over the telephone. However, a subsequent confirmation message may preferably be sent by the financial institution via the communication system 300, thereby causing a balance to be updated in memory 206. This dual communication for the transaction confirmation message adds another desirable level of verification and security to the communication system 300.

Figure 5C:
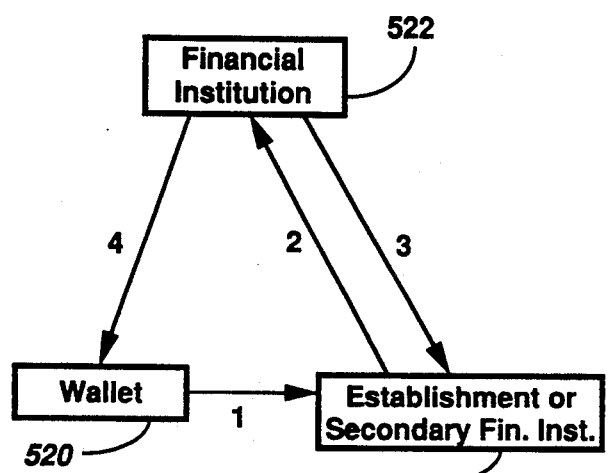

In FIG. 5C, an electronic wallet 520 initiates a transaction with a financial institution 522 and a third party (e.g., an establishment or a secondary financial institution) 524 by sending a message to the financial institution 522 via the third party 524. This message may be entered through the third party 524 in a number of ways, as previously discussed for FIG. 5B. Subsequently, the financial institution 522 may send a message to the electronic wallet 520 via the communication system 300. In this way, a transaction may be initiated from the electronic wallet 520 via a third party 524, and verified and recorded at the financial institution 522. Moreover, the electronic wallet 520 may receive a confirmation message from the financial institution 512 to verify at the electronic wallet 520 the transaction with the message, and to update a balance in memory 206 (see FIG. 2A) in response to the message. An example of such a transaction may include a cash transaction (i.e., where the electronic wallet 520 communicates with the financial institution 522 to modify an amount in an account balance, as discussed earlier). Additionally, the electronic wallet 520 may initiate a purchase transaction via a third party 524. In these cases, the electronic wallet 520 may initiate the transaction by one of the aforementioned means (e.g., presenting a check or voucher 120 to the third party 524, presenting information on the display 108 to the third party 524, presenting a financial card 130 to the third party 524, transmitting a message including information relating to a balance to communication system terminal equipment corresponding to the third party 524, coupling the message to the communication system terminal equipment corresponding to the third party 524 via the computer interface 236, and coupling the message to the communication system terminal equipment corresponding to the third party 524 via tone and/or modem communication). The third party 524 subsequently handshakes the information with the financial institution 522, thereby receiving a confirmation of the transaction from the financial institution 522. For example, handshaking may be handled using a conventional point of sale (POS) terminal equipment after an establishment 524 receives the universal financial card 130 from a customer. An approval code provided to the establishment 524 by the financial institution 522 may serve as a confirmation of the transaction. And lastly, the financial institution 522 sends a confirmation message to the electronic wallet 520 via the communication system 300. Once the transaction is verified and confirmed by the financial institution 522, an establishment 524 may provide purchased goods or service as part of the transaction. Subsequently, the electronic wallet 520 may receive a confirmation message from the financial institution 522 via the communication system 300 to confirm the transaction information, and/or to update a balance in memory 206 to summarize transaction activity for an account in the financial institution 522.

Figure 5D:
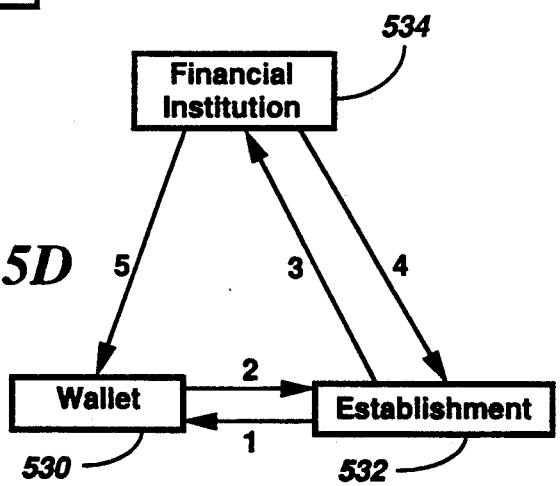

In FIG. 5D, an extended transaction (e.g., an extended purchase transaction) is shown. The information for the transaction may be initially captured from the establishment 532 by using the bar code reader 116 (see FIG. 1). Consequently, entering transaction details may be more efficient and reliable. This is especially advantageous in capturing very detailed or voluminous transaction information (e.g., purchasing groceries from a supermarket). For example, the electronic wallet 530 may read bar codes directly from products on the supermarket shelves, or preferably from a catalog, to efficiently capture product details and optionally to compare product attributes and alternatives within the electronic wallet 530. Once detailed transaction information is captured in the electronic wallet 530, a transaction (e.g., a purchase transaction) may be initiated with the establishment 532 and the financial institution 534, as discussed earlier. Preferably, communication system terminal equipment may be located at the establishment 532 (e.g., the supermarket checkout area). As discussed earlier, such equipment may receive a message from the electronic wallet 530 to initiate the transaction. The message may be transmitted by the electronic wallet 530, may be coupled to the communication system terminal equipment via the computer interface 236, or may be coupled to the communication system terminal equipment via tone and/or modem communication. In this way, an extended purchase transaction (e.g., a supermarket purchase transaction) may be initiated by the electronic wallet 530. Subsequently, a confirmation message may be received by the electronic wallet 530 from the financial institution 534 via the communication system 300 to confirm the transaction information, and/or to update a balance in memory 206 to summarize transaction activity for an account in the financial institution 522.

A major advantage in the aforementioned extended purchase transaction (e.g., the supermarket purchase transaction), may be provided to the establishment 532. The establishment 532 may segregate a customer showroom area from a main product warehousing area, thereby optimizing the use of space and other resources (e.g., electricity, lighting, air-conditioning, personnel, etc.). A customer may scan bar codes with the bar code reader 116 (see FIG. 1) from a catalog or from exemplary products that may be stocked in unit quantities at the customer showroom. Once the extended purchase transaction is initiated and confirmed, the purchased goods may be collected by warehousing personnel, transferred from the product warehousing area to the customer showroom area, and delivered to the customer. Optionally, the supermarket may receive a purchase request from a remotely located customer (i.e., initiated by the customer using a catalog and an electronic wallet 530 via tone and/or modem communication over telephone lines). Then, upon a confirmed purchase transaction (i.e., confirmed for the supermarket and for the electronic wallet 530), the purchased goods may be delivered to the remotely located customer. Therefore, an efficient product warehousing operation, order processing operation, and a convenient customer showroom may significantly enhance the performance of a supermarket business.

Figure 5E:
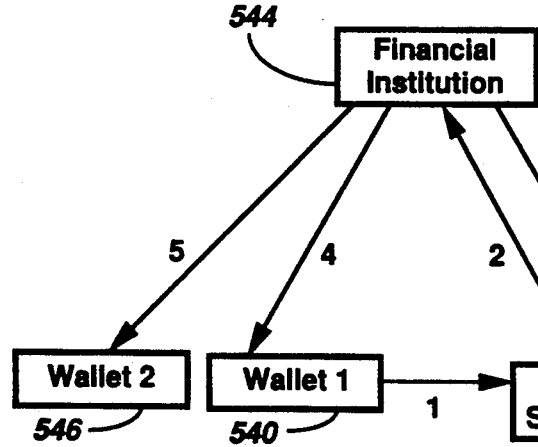
Figure 6A:
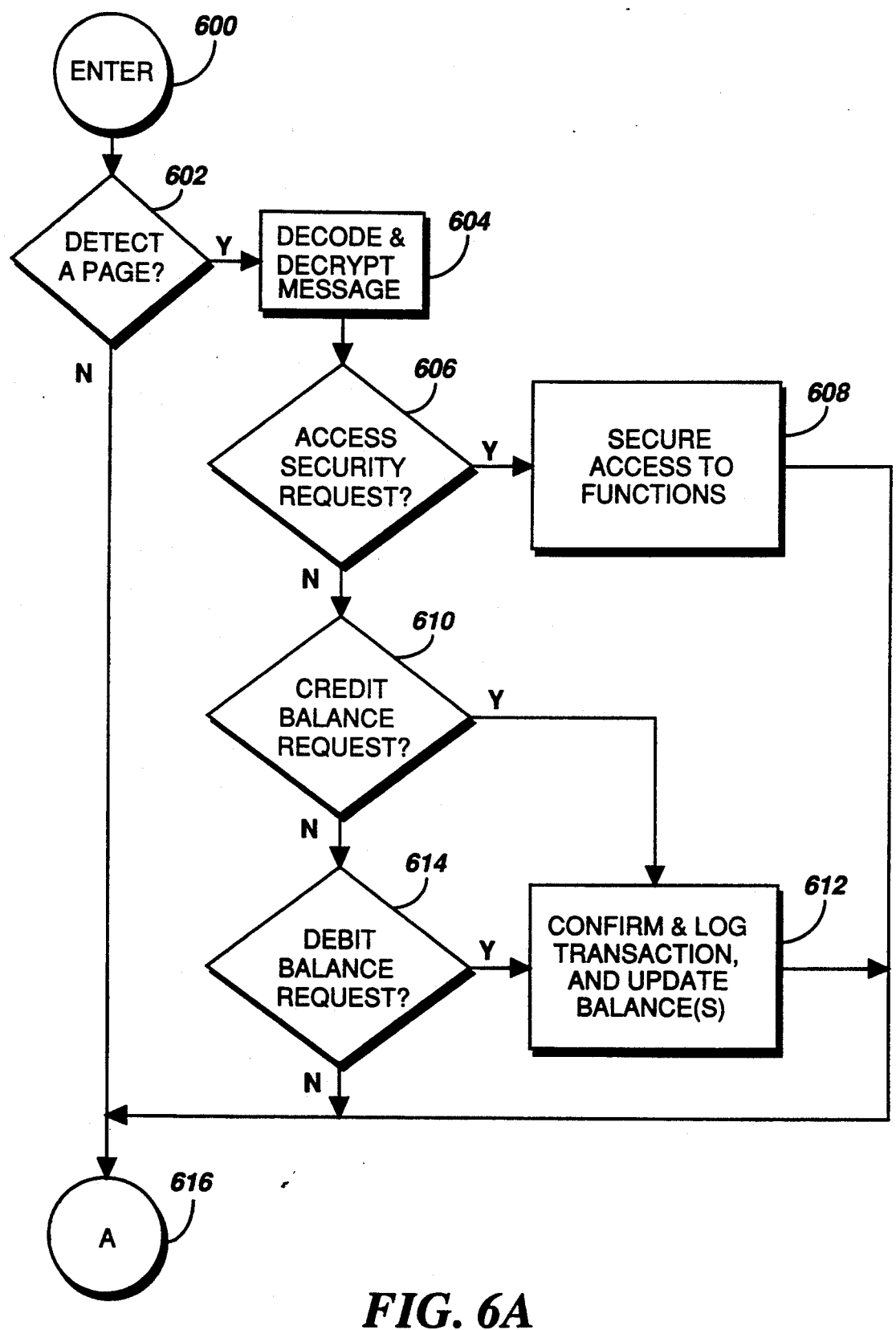
FIGS. 6A thru 6D comprise a flow diagram for a controller of the electronic wallet, in accordance with the present invention.
Figure 6B:
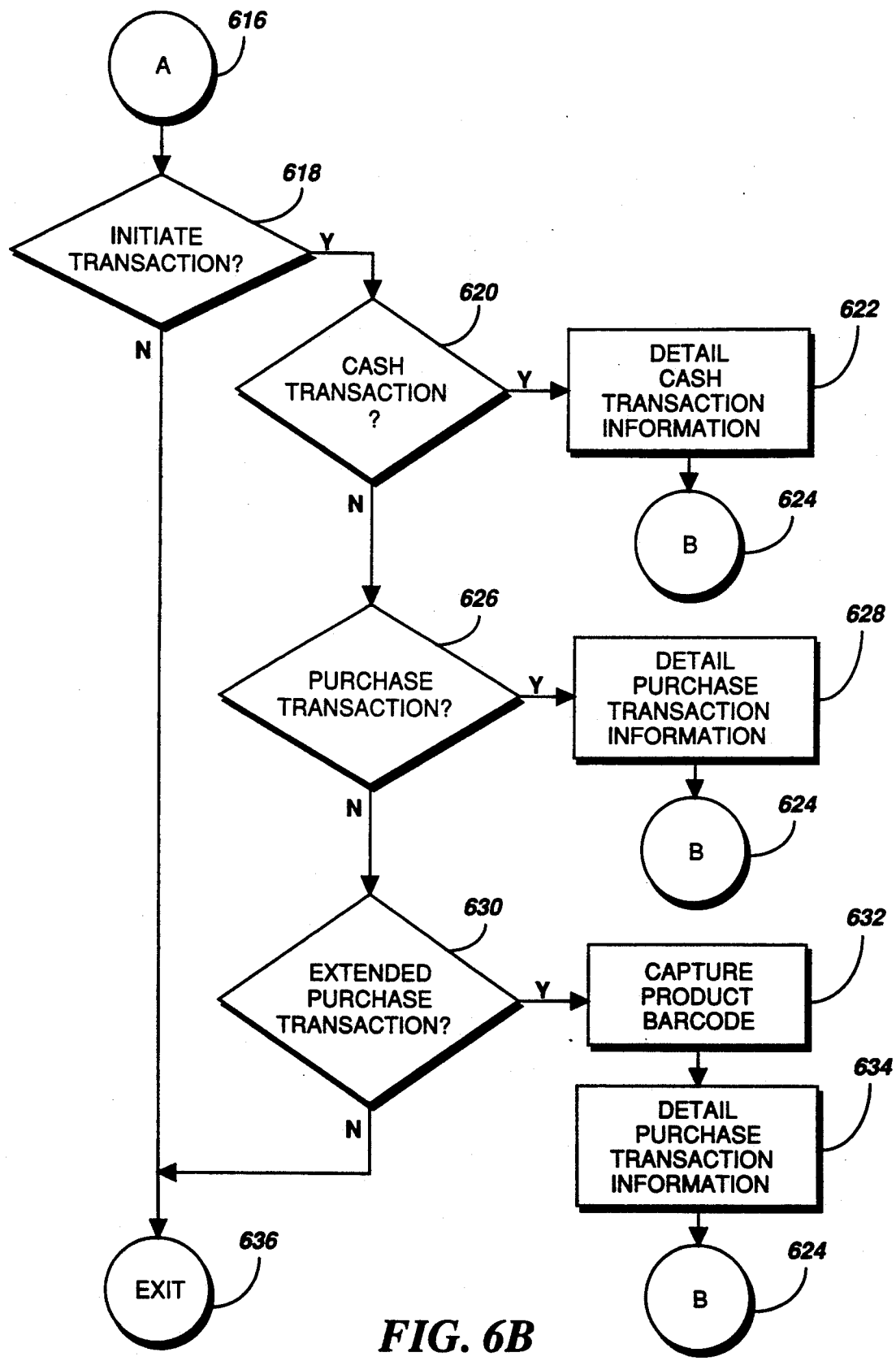
Figure 6C:
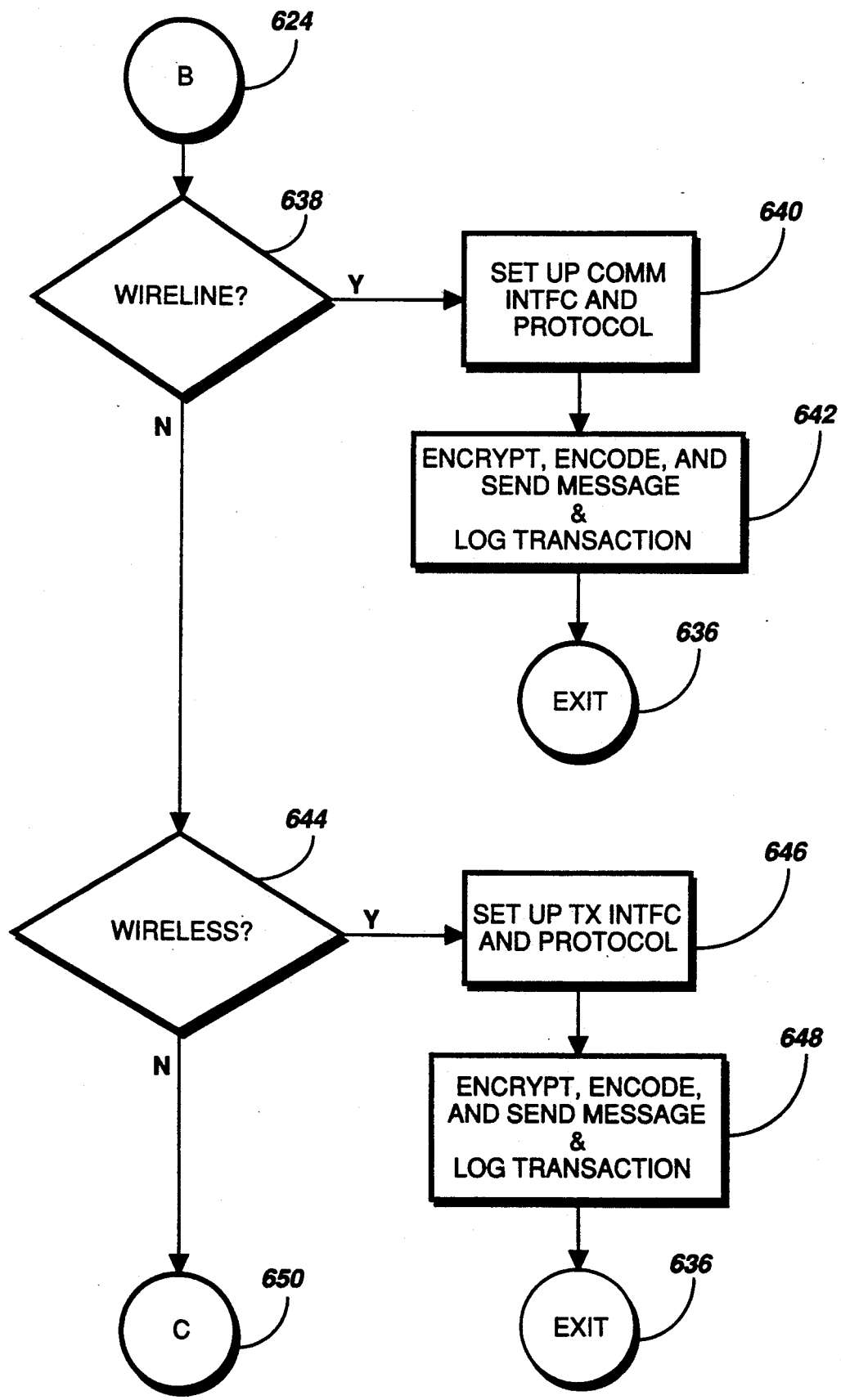
Figure 6D:
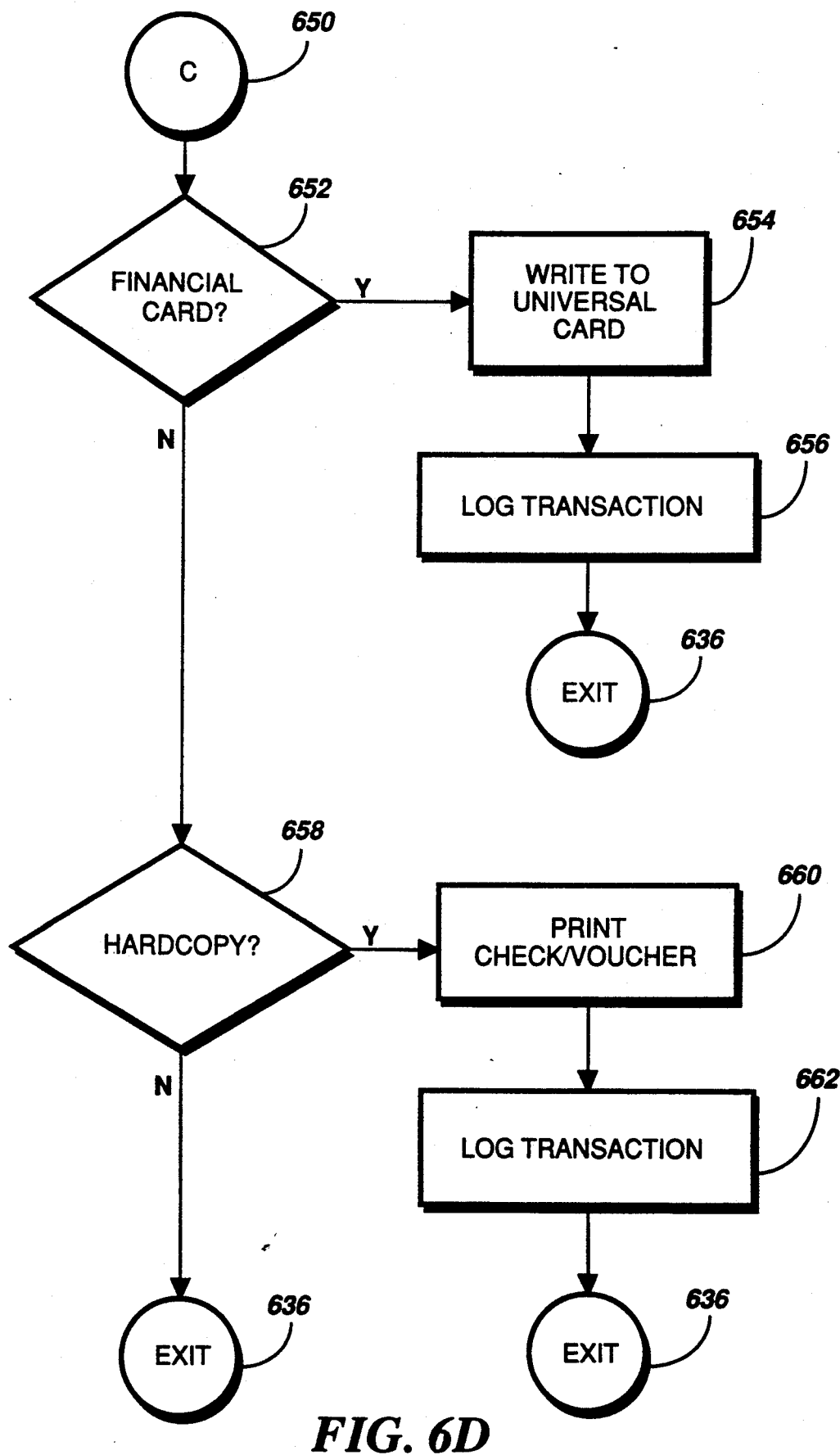
Figure 7:
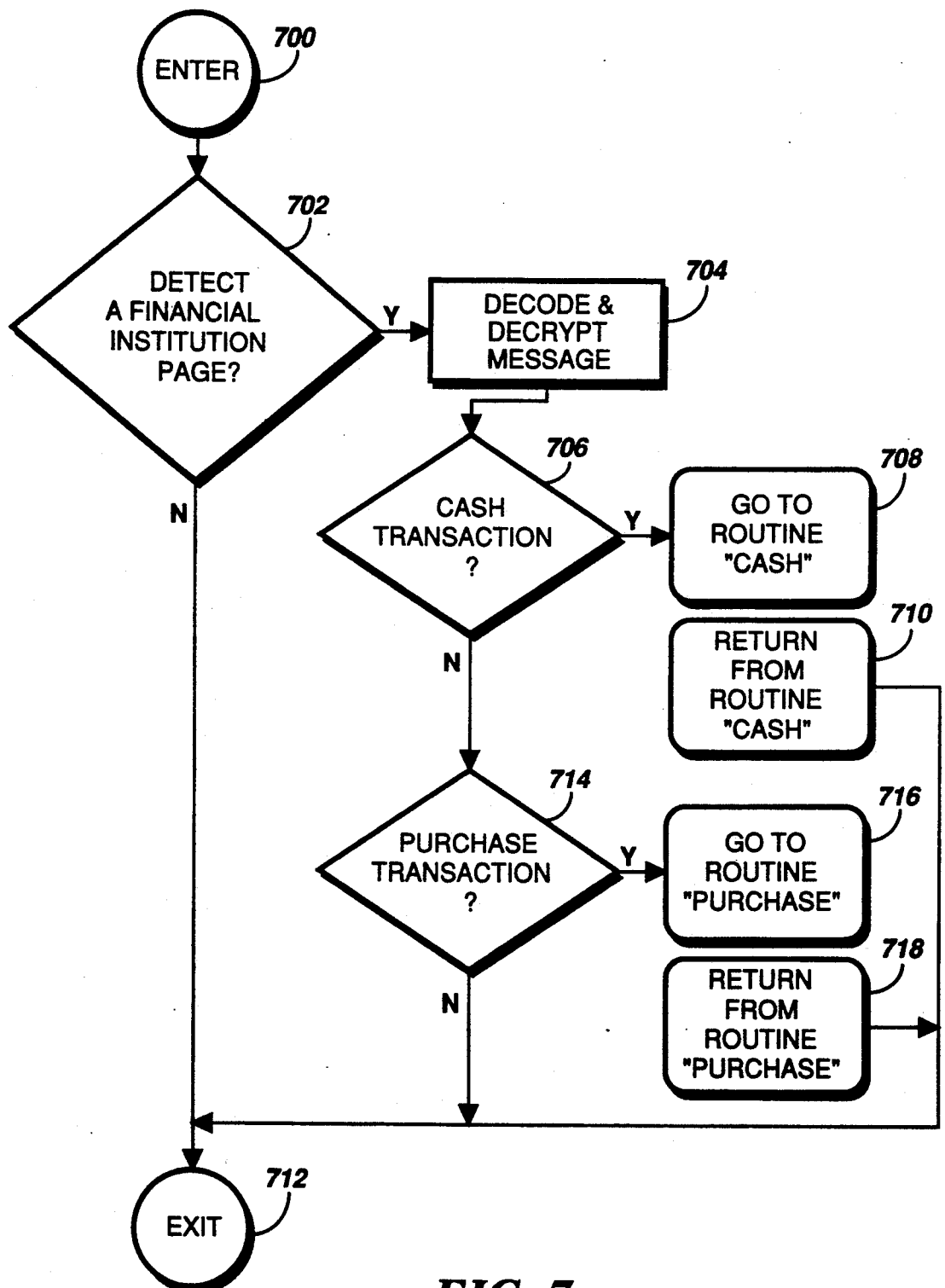
FIG. 7 thru FIG. 12 are flow diagrams illustrating a number of operations of the communication system of FIG. 3.
Figure 8:
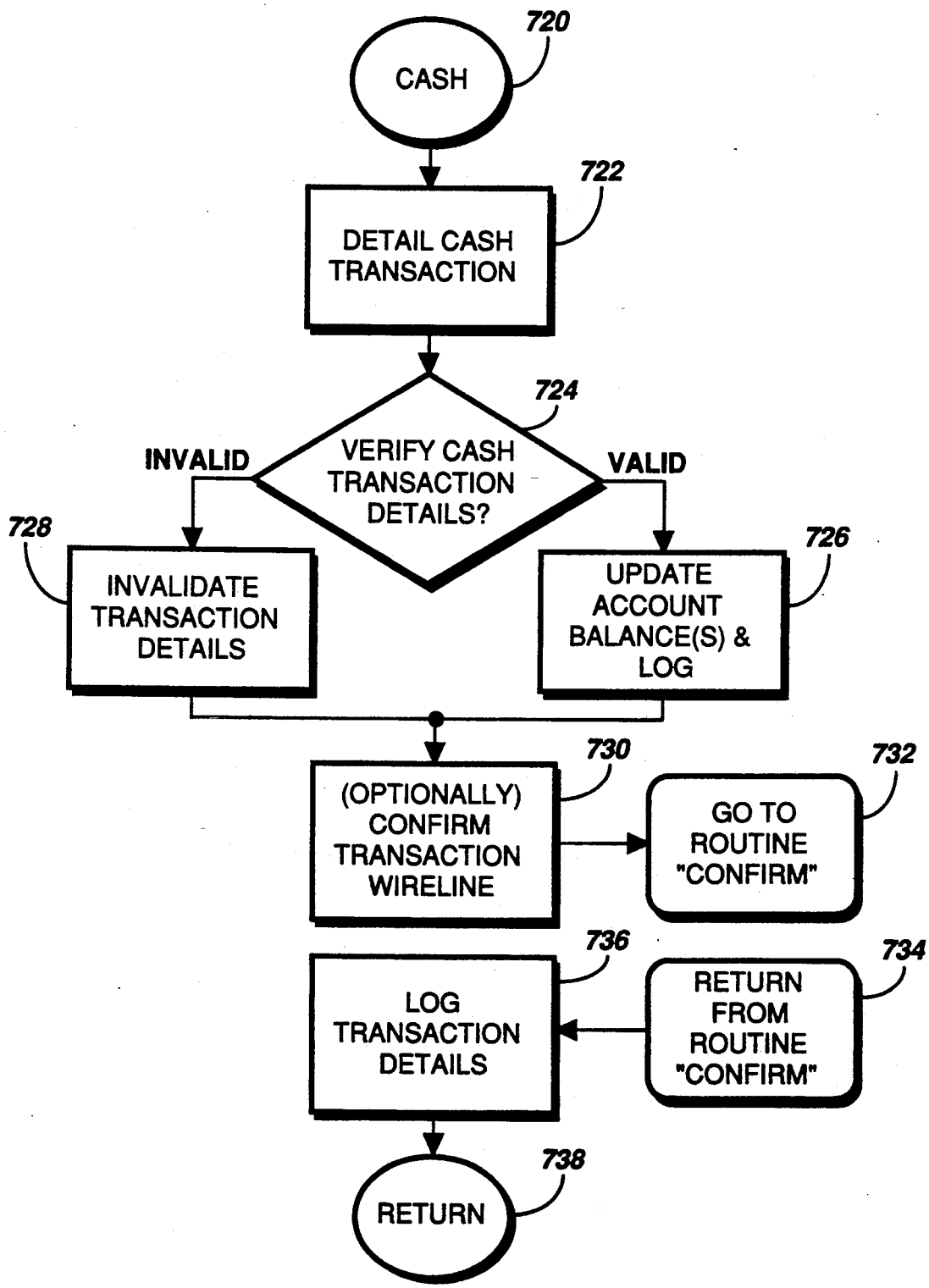
Figure 9:
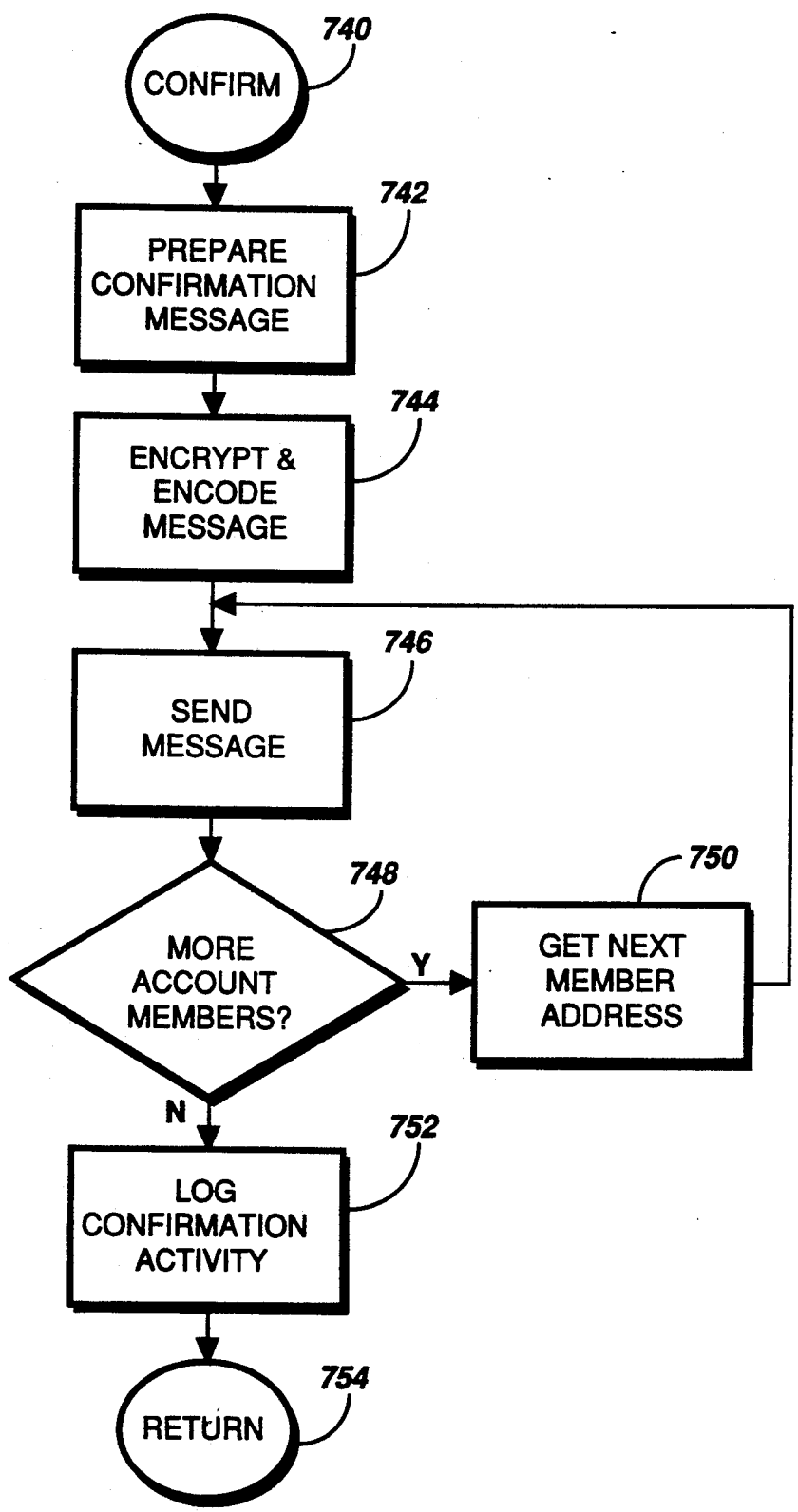
Figure 10:
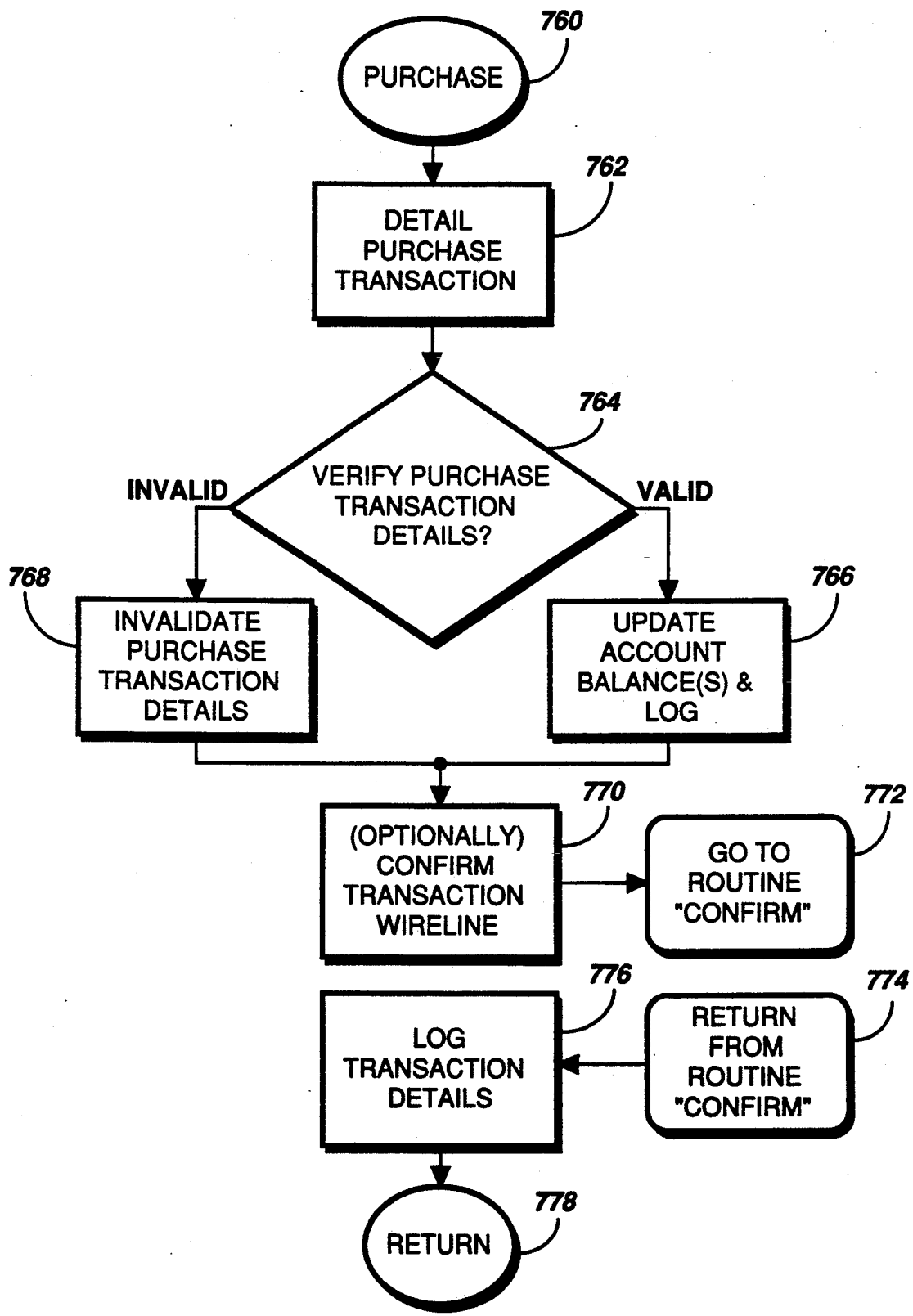
Figure 11:
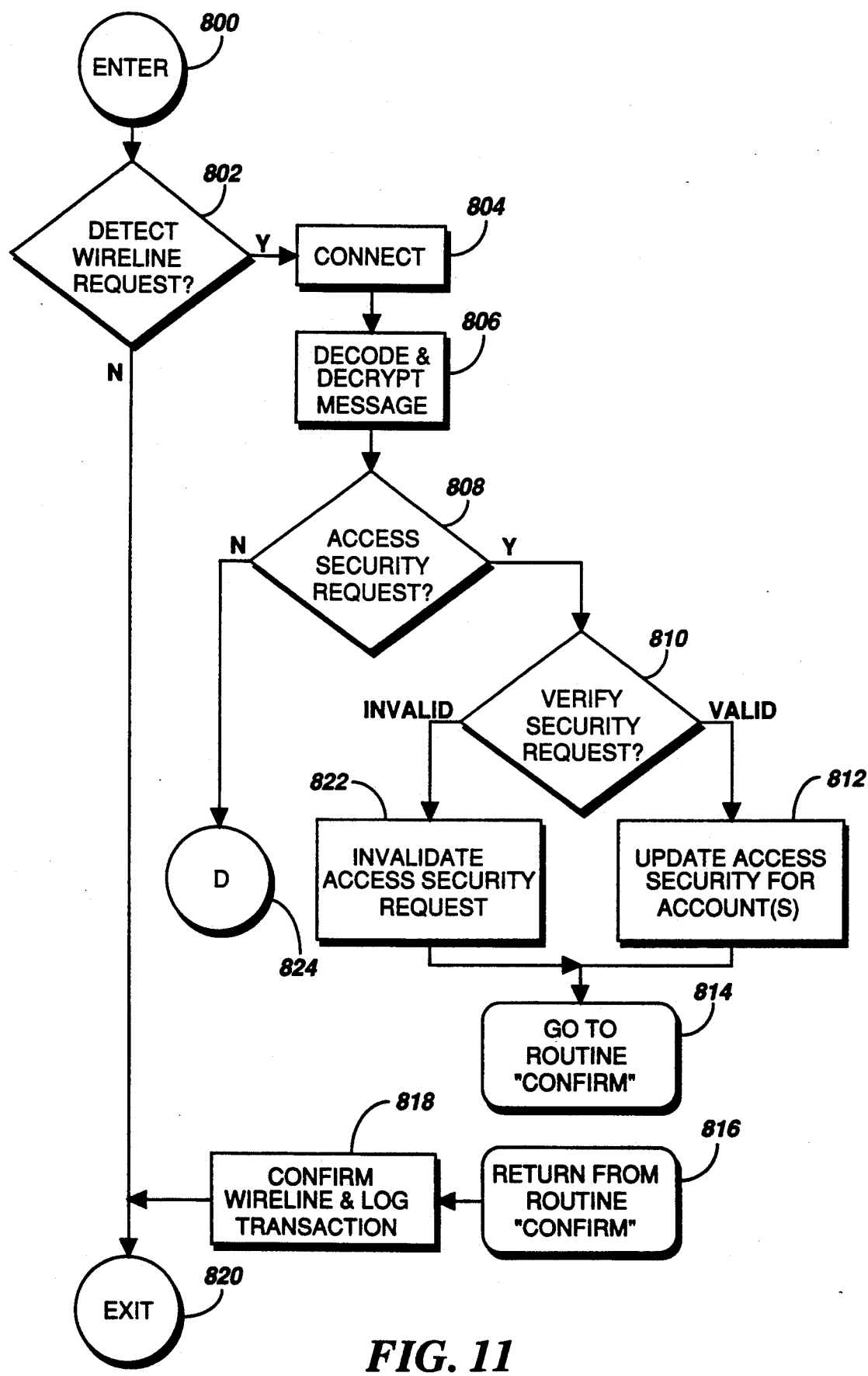
Figure 12:
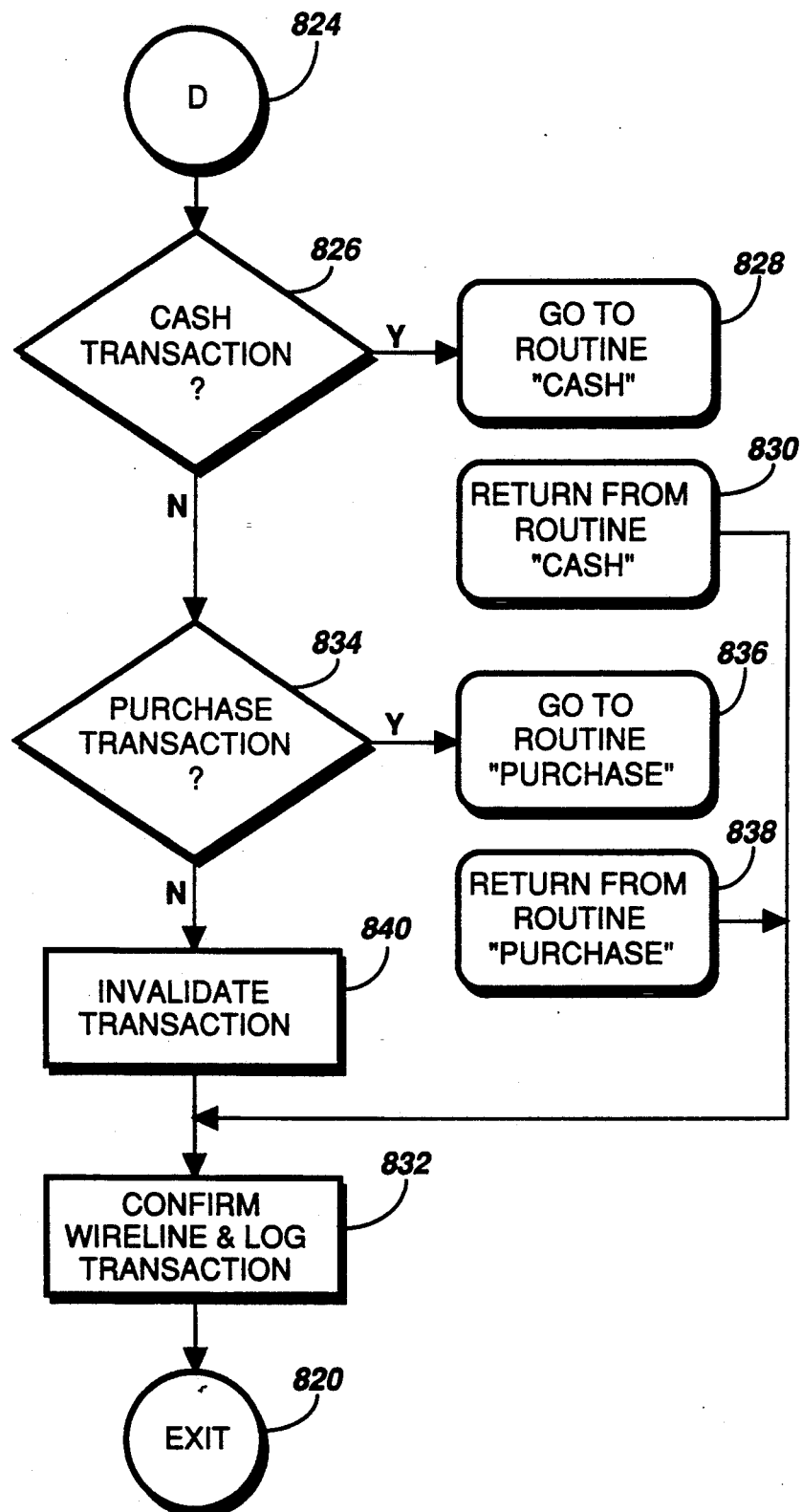

In FIG. 5E, a plurality of electronic wallets (540 and 546) share an account in a financial institution 544. When any one of the electronic wallets (540) may initiate a transaction (e.g., a purchase transaction with a third party 542), the transaction is confirmed and updated for each of the plurality of electronic wallets (540 and 546) by the financial institution 544 via the communication system 300. In this way, all the electronic wallets that share a common account with the financial institution 544 may be updated with current financial information and/or a current balance summary of transaction activity for the account. Moreover, a first wallet 540 may be capable of updating financial information for a second wallet 546 (i.e., similar to the cash transaction discussed above) to update an account limit or other transaction information for the second wallet 546 via the financial institution 544 and the communication system 300. Additionally, a security transaction (i.e., a lost electronic wallet 546 requiring a user access control message to be sent by the communication system 300) may be updated to all electronic wallets (540 and 546) that share the account. Consequently, at least one electronic wallet 546 may be secured accordingly, and other member electronic wallets (540) may be updated with the security transaction information, as may be necessary for security procedures by the electronic wallets (540 and 546) in the communication system 300. Lastly, the first wallet 546 may be capable of monitoring transaction activity (e.g., financial transaction activity such as purchasing or other expenses) for the second wallet 540, including a balance summary for transactions initiated by the second wallet 540. This may be a powerful management tool for maintaining current records of transaction activity by individuals. A number of advantages presented herein and other advantages for updating transaction information and/or updating a balance for each of the plurality of electronic wallets (540 and 546) may be appreciated.

Referring to FIGS. 6A thru 6D, a flow diagram for a controller 205 (see FIGS. 2A and 2B) of an exemplary electronic wallet 100 is shown, in accordance with the present invention. In view of the financial transactions previously discussed for FIGS. 5A thru 5E, the electronic wallet 100 may detect a page 602, and subsequently decode and decrypt at least a portion of a message received. A security transaction 606, as discussed for FIG. 5A, may cause the controller 205 to secure access to functions 608 of the electronic wallet 100, as discussed earlier. In a second example, a cash transaction may cause a credit 610 or a debit 614 to a balance in memory 206, as part of confirming a transaction for the electronic wallet 100. Alternatively, a transaction may be initiated by a user of the electronic wallet 100, typically entering user input controls 209 to identify the type of transaction (e.g., a cash transaction 620, a purchase transaction 626, and an extended purchase transaction 630). Subsequently, the user may enter details of the transaction (622, 628, or 634) (e.g., mode of initiating the transaction, an amount, a financial institution account identification, date information, etc.) via the user input controls 209. In the extended purchase transaction 630, the electronic wallet 100 may additionally capture product bar code information 632, as discussed earlier.

Once the transaction information details are captured, the controller 205 may continue 624 to determine the appropriate action necessary for the selected mode of initiating the transaction (e.g., wireline 638, wireless 644, financial card 652, or hardcopy). For the wireline communication 638 (e.g., using tone and/or modem communication over telephone lines), the controller 205 may subsequently configure the telephone interface circuitry 230, the DTMF transceiver 234, and the modem 232 as necessary for communicating a message. The controller 205 may then encrypt and encode the message as necessary, and send the message via tone and/or modem communication. Additionally, a record of the initiated transaction information may be logged (i.e., stored into memory 206) (642, 6360. For the wireless communication 644, the controller 205 may subsequently turn "on" the transmitter and begin transmitting protocol 646 following a standard protocol, as discussed earlier. Lastly, the controller may encrypt and encode the message as necessary, and transmit the message 648. Additionally, a record of the initiated transaction information may be logged into memory 206. For the financial card transaction (650 and 652), the controller 205 may write (128) at least one of a financial information and a balance to the universal financial card 130. As part of the writing process, a writing status indication may be indicated to the user. Subsequently, a record of the initiated transaction information may be logged into memory 206 (656 and 636). For the hardcopy transaction 658, the electronic wallet 100 may print 660 a check or voucher 120 as necessary, and log the transaction information into memory 206 (662 and 636). Therefore, a number of transactions may be initiated by the exemplary electronic wallet 100. Also, a subsequent confirmation message may be received by the electronic wallet 100, similar to the cash transaction discussed above. The message may be decoded and at least a portion of the message decrypted 604. Consequently, a confirmation message may lead to a balance being updated in memory (610 and 612, or 610, 614, and 612).

Referring to FIGS. 7 thru 12, a number of flow diagrams illustrate some operations of the exemplary communication system of FIG. 3. The paging system 300 may receive and detect a page 702 from an electronic wallet 100. The message may then be decoded and decrypted 704, as necessary. In this exemplary system 300, a cash transaction 706 or a purchase transaction 714 may be initiated by a transmission from the electronic wallet 100.

For the cash transaction 706, the paging terminal controller 410 may extract the cash transaction details from the message (708, 720, and 722). Then, a verification of the transaction details 724 may invalidate the transaction by designating the message as invalid 728. Conversely, a valid transaction request may cause an account balance to be updated 726 for the financial computer system 306. In either validity determination, a wireline transaction may optionally be confirmed via wireline interface 730. Subsequently, a confirmation message may be sent to at least one selective call receiver 200 of an electronic wallet 100 via the communication system 300. The message is normally formatted according to the requirements of the communication protocol (732, 740, and 742), and encrypted and encoded 744 as necessary. Then, in the exemplary paging system 300, the confirmation message is repeatedly transmitted to each selective call receiver 200 that is a member of the account at the financial institution computer system 306 (746, 748, and 750). Lastly, a log of the confirmation message communication activity and the transaction details are stored in memory 414 (752, 754, 734, 736, 738, 710, and 712).

In similar fashion, the purchase transaction 714 extracts the transaction details from the message and verifies the transaction details accordingly (716, 760, 762, and 764). An invalid purchase transaction determination may designate the message as invalid 768. Conversely, a valid purchase transaction request may cause an account balance to be updated 766 for the financial computer system 306. In either validity determination, a wireline transaction may optionally be confirmed via wireline interface 770. Subsequently, a confirmation message may be sent to at least one selective call receiver 200 of an electronic wallet 100 via the communication system 300. Each electronic wallet 100 that is member of an account in the financial institution computer system 306 may be updated with the confirmation message, similar to the cash transaction confirmation communication sequence discussed above. Also, a log of the confirmation message communication activity and the transaction details are similarly stored in memory.

Moreover, a transaction may be initiated from an electronic wallet 100 via wireline communication (800 and 802). The paging system 300 may automatically answer the telephone and perform a connection procedure with a caller 804. Such a caller may be an electronic wallet 100 or a third party, such as an establishment or a secondary financial institution, as discussed earlier. The message received via wireline communication may comprise tone and/or modem communication. After decoding and decrypting a message 806, as needed, either a user access control request 808, a cash transaction request 826, or a purchase transaction request 834 may be recognized by the exemplary system. A security message (i.e., requesting a user access control to be updated for at least one electronic wallet 100) may be validated (810) by the communication system 300. A valid request may update an access security information for an account 812 in the financial institution computer system 306, and confirm and update the security message for each electronic wallet 100 that is a member of that account (814, 740, 742, 744, 746, 748, 750, 752, and 754). Subsequently, a log of the transaction details may be stored in memory 414, and a confirmation may be sent via wireline to the caller. An invalid request designates the security message as invalid, confirms the attempt to all member electronic wallets, confirms the attempt via wireline to the caller, and logs the transaction into memory 414. The cash and the purchase transactions (826 and 834) are handled as discussed earlier. A wireline confirmation to the caller and a log of the transaction into memory 414 then follows.

What is claimed is:
1. An electronic wallet, comprising:
   storing means for storing at least a balance corresponding to an account in a financial institution;
   selective call receiving means for receiving a wireless message transmitted from a remote transmitter, the wireless message including financial information relating to the balance for confirming a financial transaction with the financial institution; and
   updating means, coupled to the storing means and to the receiving means, for updating the balance in the storing means in response to the wireless message.
2. The electronic wallet of claim 1, further comprising bar code reading means coupled to the storing means for reading into the storing means a representa- tion of bar code information for initiating the financial transaction with the financial institution.

3. The electronic wallet of claim 1, further comprising means for wireless transmitting a message including financial information relating to the balance for initiating the financial transaction with the financial institution.

4. The electronic wallet of claim 1, further comprising means for encrypting and decrypting at least one of a financial information and the balance stored in the storing means, an encryption/decryption key being utilized by the means for encrypting and decrypting for securely receiving and decrypting the financial information relating to the balance, and for decrypting and then encrypting the balance for updating the balance in the storing means in response to the wireless message.

5. The electronic wallet of claim 5, wherein the encryption/decryption key is stored in the storing means, and the selective call receiving means being capable of receiving a wireless access control message transmitted from a remote transmitter, the storing means being responsive to the access control message for erasing the encryption/decryption key from the storing means for securing the financial information and the balance stored in the storing means in response to receiving the access control message.

6. The electronic wallet of claim 1, further comprising initiating means, coupled to the storing means and to the selective call receiving means, for initiating a financial transaction, and receiving a confirmation of the financial transaction from the financial institution via the wireless message including financial information relating to the balance.

7. The electronic wallet of claim 6, further comprising modem means coupled to the initiating means for initiating the transaction via modem communication.

8. The electronic wallet of claim 6, further comprising tone transmitting means coupled to the initiating means for initiating the transaction via tone communication.

9. The electronic wallet of claim 6, further comprising verifying means, coupled to the selective call receiving means and to the initiating means, for verifying the initiated financial transaction with the wireless message including financial information relating to the balance.

10. The electronic wallet of claim 1, further comprising printing means coupled to the storing means for printing at least one of a financial information and the balance, and for printing checks/vouchers for initiating financial transactions with the financial institution, each financial transaction being confirmed with a wireless message including financial information relating to the balance.

11. The electronic wallet of claim 1, further comprising magnetic writing means coupled to the storing means for magnetically writing a representation of at least one of a financial information and the balance to a universal financial card for initiating the financial transaction with the financial institution.

12. The electronic wallet of claim 11, further comprising indicating means for indicating the status of the magnetic writing means.

13. The electronic wallet of claim 11, further comprising magnetic reading means coupled to the storing means for magnetically reading into the storing means a representation of financial information from at least one financial card, the representation of financial information stored in the storing means from one of the at least one financial card can be selectively written to the universal financial card for initiating a financial transaction with a financial institution corresponding to the one of the at least one financial card.

14. The electronic wallet of claim 1, further comprising securing means for controlling user access to functions of the electronic wallet, the securing means being responsive to a received wireless message comprising a user access control message.

15. The electronic wallet of claim 14, further comprising means for encrypting and decrypting at least one of a financial information and the balance stored in the storing means using a key stored in the storing means, and wherein the securing means in response to the user access control message erases the key to secure any encrypted at least one of the financial information and the balance and causes a flag to be stored in the storing means to prevent unauthorized use of the electronic wallet.

16. In an electronic wallet, a method comprising the steps of:
storing at least a balance corresponding to an account in a financial institution;
automatically initiating a financial transaction with the financial institution from the electronic wallet;
selective call receiving a wireless message transmitted from a remote transmitter, the wireless message including financial information relating to the balance for confirming the financial transaction with the financial institution; and
updating the balance in response to the wireless message.

17. The method of claim 16, further comprising the step of reading bar code information for automatically initiating the financial transaction, and wherein the wireless message comprises a confirmation of the financial transaction.

18. The method of claim 16, further comprising the step of transmitting a wireless message from the electronic wallet to a remote receiver including information relating to the balance for initiating the financial transaction.

19. The method of claim 16, further comprising the steps of encrypting at least one of a financial information and the balance and storing the encrypted at least one of the financial information and the balance in the electronic wallet.

20. The method of claim 16, further comprising the step of decrypting at least one of an encrypted financial information and an encrypted balance.

21. The method of claim 20, wherein the decrypting step decrypts an encrypted financial information included with a received wireless message and further decrypts an encrypted balance stored in the electronic wallet to provide an updatable balance for updating the updatable balance in response to the received financial information included with the wireless message confirming the financial transaction with the financial institution.

22. The method of claim 16, further comprising the step of magnetically writing a representation of at least one of a financial information and the balance stored in the electronic wallet to a universal financial card for initiating a financial transaction with the financial institution having an account corresponding to the balance.

23. The method of claim 16, further comprising the steps of magnetically reading a representation of financial information from at least one financial card corresponding to at least one account in at least one financial institution, storing the read representation of financial information into the electronic wallet, and magnetically writing a representation of the stored financial information corresponding to one of the at least one account to the universal financial card for initiating a financial transaction with the one of the at least one account in the at least one financial institution corresponding to the stored financial information.

24. The method of claim 16, further comprising the step of verifying the automatically initiated financial transaction with the received wireless message including financial information relating to the balance for confirming the financial transaction with the financial institution.

25. The method of claim 16, further comprising the step of printing at least one of a financial information and the balance, and printing checks/vouchers for initiating financial transactions with the financial institution, each financial transaction being confirmed with a wireless message including financial information relating to the balance.

26. The method of claim 16, further comprising the step of storing a flag in the electronic wallet for prohibiting user access to financial functions of the electronic wallet in response to a received wireless message comprising a user access control message.

27. The method of claim 24, further comprising the steps of:
encrypting at least one of a financial information and the balance stored in the electronic wallet using a key stored in the electronic wallet;
decrypting the at least one of the financial information and the balance stored using the key; and
securing any of the encrypted at least one of the financial information and the balance stored in the electronic wallet by erasing the key in response to the received user access control message.

28. A communication system for communicating financial information, comprising:
storing means for storing at least a balance corresponding to an account in a financial institution;
paging system transmitting means coupled to a computer system associated with the financial institution for transmitting a wireless message including information relating to the balance corresponding to the account in the financial institution, the wireless message confirming a financial transaction with the financial institution;
selective call receiving means for receiving the wireless message from the paging system transmitting means; and
updating means, coupled to the storing means and to the selective call receiving means, for updating the balance in the storing means in response to the wireless message.

29. The communication system of claim 28, further comprising initiating means, coupled to the storing means and to the selective call receiving means, for initiating a financial transaction, and wherein the received wireless message comprises a confirmation of the initiated financial transaction.

30. The communication system of claim 29, further comprising verifying means, coupled to the selective call receiving means and to the initiating means, for verifying the initiated financial transaction with the received wireless message.

31. The communication system of claim 29, further comprising modem means coupled to the initiating means for initiating the transaction via modem communication.

32. The communication system of claim 28, further comprising electronic wallet transmitting means, coupled to the storing means and the selective call receiving means, for transmitting a wireless message from an electronic wallet to a paging receiver, the wireless message including information relating to the balance for initiating a financial transaction with the financial institution.

33. A communication system, comprising:
means for entering a financial transaction into the communication system from one of a plurality of associated portable data devices; and
means for updating the financial transaction from the communication system to the one of the plurality of associated portable data devices and to at least a second portable data device of the plurality of associated portable data devices via wireless message communication from at least one remote transmitter.

34. The communication system of claim 33, wherein the communication system comprises a financial institution computer system coupled to a paging system capable of coupling the entered financial transaction to the financial institution computer system, and the updating means comprises a paging system transmitting means coupled to the financial institution computer system for transmitting paging information including wireless message communication to update the financial transaction at the one of the plurality of portable devices and at the at least a second portable data device.

35. The communication system of claim 33, wherein the means for entering a transaction comprises modem means for communicating via modem communication.

36. An electronic wallet, comprising:
storing means for storing at least a balance corresponding to an account in a financial institution;
selective call receiving means for receiving a wireless message transmitted from a remote transmitter, the wireless message including financial information relating to the balance for confirming a financial transaction with the financial institution;
updating means, coupled to the storing means and to the selective call receiving means, for updating the balance in the storing means in response to the wireless message;
wireless message transmitting means, coupled to the storing means and to the selective call receiving means, for initiating a financial transaction with the financial institution by transmitting a wireless message including financial information corresponding to the account, the selective call receiving means operating to receive a confirmation of the financial transaction by receiving the wireless message transmitted from the remote transmitter and including the financial information relating to the balance;
modem means coupled to the initiating means for initiating the financial transaction with the financial institution via modem communication, and then confirming the financial transaction by the selective call receiver subsequently receiving the wireless message from the remote transmitter;
verifying means, coupled to the selective call receiving means and to the wireless message transmitting means, for verifying the financial transaction with the received wireless message including financial information relating to the balance;

printing means coupled to the storing means for printing check/vouchers for initiating financial transactions with the financial institution, each financial transaction being confirmed with a wireless message including financial information relating to the balance;

magnetic reading means coupled to the storing means for magnetically reading into the storing means a representation of financial information from at least one financial card;

magnetic writing means coupled to the storing means for magnetically writing a representation of the financial information stored in the storing means from one of the at least one financial card to a universal financial card for initiating a financial transaction with a financial institution corresponding to the one of the at least one financial card, the financial transaction being confirmed by the selective call receiver subsequently receiving the wireless message from the remote transmitter;

timer means coupled to the storing means for storing time information in the storing means; and securing means, responsive to a received wireless message having access control information, for prohibiting user access to financial functions of the electronic wallet.

37. The electronic wallet of claim 1, wherein the selective call receiving means comprises a paging receiver for receiving a page as the remote wireless message from a paging system.

38. The electric wallet of claim 6, wherein the initiating means comprises a transmitting means for transmitting a wireless paging message to a remote paging receiver coupled to a financial computer system of a financial institution to initiate the financial transaction via a paging system, the selective call receiving means subsequently receiving a confirmation of the initiated financial transaction from the financial computer system of the financial institution by receiving a wireless paging message transmitted from a remote paging transmitter, the received wireless paging message including financial information relating to the balance.

* * * * *